(12) United States Patent
Kang

(10) Patent No.: US 10,593,273 B2
(45) Date of Patent: Mar. 17, 2020

(54) IMAGE DISPLAY APPARATUS CAPABLE OF IMPROVING SHARPNESS OF AN EDGE AREA

(71) Applicant: LG ELECTRONICS INC., Seoul (KR)

(72) Inventor: Kyungjin Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 175 days.

(21) Appl. No.: 15/657,058

(22) Filed: Jul. 21, 2017

(65) Prior Publication Data

US 2018/0040284 A1 Feb. 8, 2018

Related U.S. Application Data

(60) Provisional application No. 62/365,801, filed on Jul. 22, 2016.

(30) Foreign Application Priority Data

Oct. 4, 2016 (KR) ........................ 10-2016-0127780

(51) Int. Cl.
*G09G 3/36* (2006.01)
*G09G 5/28* (2006.01)
(Continued)

(52) U.S. Cl.
CPC .......... *G09G 3/3607* (2013.01); *G09G 3/003* (2013.01); *G09G 5/10* (2013.01); *G09G 5/28* (2013.01);
(Continued)

(58) Field of Classification Search
CPC .......... G09G 3/3607; G09G 5/10; G09G 5/28; G09G 3/003; G09G 2300/0443;
(Continued)

(56) References Cited

U.S. PATENT DOCUMENTS 10,176,753 B2 * 1/2019 Wang .................. G09G 3/2003
2009/0058873 A1 3/2009 Brown Elliott et al.
(Continued)

FOREIGN PATENT DOCUMENTS

EP 2980780 2/2016

OTHER PUBLICATIONS

European Patent Office Application Application Serial No. 17182539.1, Search Report dated Nov. 24, 2017, 19 pages.

*Primary Examiner* — Rodney Amadiz
(74) *Attorney, Agent, or Firm* — Lee, Hong, Degerman, Kang & Waimey PC

(57) ABSTRACT

The present invention relates to an image display apparatus including a panel having repeatedly arranged RGBW subpixels and pixels including a first pixel, second pixel and third pixel, each having at least three subpixels and the first and third pixels being disposed immediately adjacent to the left and right sides of the second pixel; a controller for applying, to the subpixels of the first or third pixel, data corresponding to a subpixel of a color not included in the second pixel. When the luminance level of the second pixel is lower than a first reference level and luminance difference between the first and second pixels or between the second and third pixels is greater than a second reference level, the controller may not apply the data to subpixels of the first or third pixel. Thus, on the RGBW type panel, sharpness of the edge area can be improved.

17 Claims, 36 Drawing Sheets
(12 of 36 Drawing Sheet(s) Filed in Color)

(51) Int. Cl.
*G09G 3/00* (2006.01)
*G09G 5/10* (2006.01)
*H04N 9/64* (2006.01)

(52) U.S. Cl.
CPC ..... *H04N 9/646* (2013.01); *G09G 2300/0443* (2013.01); *G09G 2300/0452* (2013.01); *G09G 2320/0633* (2013.01); *G09G 2340/0457* (2013.01); *G09G 2340/06* (2013.01); *G09G 2340/14* (2013.01)

(58) Field of Classification Search
CPC ....... G09G 2340/14; G09G 2320/0633; G09G 2340/0457; G09G 2340/06; G09G 2300/0452; H04N 9/646
See application file for complete search history.

(56) References Cited

U.S. PATENT DOCUMENTS

| | | |
|---|---|---|
| 2010/0149204 A1 | 6/2010 | Han |
| 2011/0148908 A1 | 6/2011 | Jeong et al. |
| 2015/0237236 A1 | 8/2015 | Elliott et al. |
| 2017/0039924 A1* | 2/2017 | Jin ................... H01L 27/3218 |

* cited by examiner (a)

(b)

(c)

IMAGE DISPLAY APPARATUS CAPABLE OF IMPROVING SHARPNESS OF AN EDGE AREA

CROSS-REFERENCE TO RELATED APPLICATION

Pursuant to 35 U.S.C. § 119, this application claims the benefit of earlier filing date and right of priority to Korean Application No. 10-2016-0127780, filed on Oct. 4, 2016, and also claims the benefit of U.S. Provisional Application No. 62/365,801, filed on Jul. 22, 2016, the contents of which are all incorporated by reference herein in their entirety.

BACKGROUND OF THE INVENTION

1. Field of the Invention

The present invention relates to an image display apparatus, and more particularly, to an image display apparatus capable of improving sharpness of an edge area for a high-frequency signal on an RGBW type panel.

2. Description of the Related Art

Digital broadcasting refers to broadcasting for transmitting digital images and voice signals. Compared to analog broadcasting, digital broadcasting is robust to external noises and thus suffers lower data loss. Further digital broadcasting is advantageous in terms of error correction, and provides high definition and clear images. Further, in contrast with analog broadcasting, digital broadcasting enables bidirectional services.

The resolution of an image display apparatus is increasing according to demands of users who want to watch clear images on the screen, and accordingly an image display apparatus with an increased resolution has been developed.

SUMMARY OF THE INVENTION

Therefore, the present invention has been made in view of the above problems, and it is an object of the present invention to provide an image display apparatus capable of improving sharpness of an edge area for a high-frequency signal on an RGBW type panel.

In accordance with an aspect of the present invention, the above and other objects can be accomplished by the provision of an image display apparatus including a panel having repeatedly arranged subpixels of RGBW and including a plurality of pixels including a first pixel, a second pixel and a third pixel, each having at least three subpixels, wherein the first pixel is disposed immediately adjacent to a left side of the second pixel and the third pixel is disposed immediately adjacent to a right side of the second pixel, a controller for applying, to at least one of the subpixels of the first pixel or the third pixel, a part or entirety of data corresponding to a subpixel of a color not included in the second pixel among respective data applied to the subpixels included in the second pixel, wherein, when a luminance level of the second pixel is lower than or equal to a first reference level and a difference in luminance between the first pixel and the second pixel or between the second pixel and the third pixel is greater than or equal to a second reference level, the controller may not apply the part or entirety of the data corresponding to the subpixel of the color not included in the second pixel to at least one of the subpixels of the first pixel or the third pixel.

In accordance with another aspect of the present invention, there is provided an image display apparatus including a panel having repeatedly arranged subpixels of RGBW and including a plurality of pixels including a first pixel, a second pixel and a third pixel, each having at least three subpixels, wherein the first pixel is disposed immediately adjacent to a left side of the second pixel and the third pixel is disposed immediately adjacent to a right side of the second pixel, a controller for applying, to at least one of the subpixels of the first pixel or the third pixel, a part or entirety of data corresponding to a subpixel of a color not included in the second pixel among respective data applied to the subpixels included in the second pixel, wherein, when the luminance level of the second pixel is lower than or equal to a first reference level, the difference in luminance between the first pixel and the second pixel or between the second pixel and the third pixel is greater than or equal to a second reference level, and data of a first color is allocated to the first pixel and the third pixel, the controller applies a part or entirety of data corresponding to a subpixel of the first color included in the second pixel to at least one of the subpixels of the first pixel or the third pixel.

In accordance with another aspect of the present invention, there is provided an image display apparatus including a panel having repeatedly arranged subpixels of RGBW, a timing controller for converting an input RGB video signal into an RGBW video signal and generating, based on RGB data of a first pixel or BWR data of a third pixel, WRG data corresponding to a second pixel, and a grill processor for setting a luminance level of the WRG data of the second pixel to a first level regardless of the RGB data of the first pixel or the BWR data of the third pixel when a luminance level of the second pixel is lower than or equal to a first reference level and a difference in luminance between the first pixel and the second pixel or between the second pixel and the third pixel is greater than or equal to a second reference level.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The above and other objects, features and other advantages of the present invention will be more clearly understood from the following detailed description taken in conjunction with the accompanying drawings, in which.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

As used herein, the suffixes "module" and "unit" are added to simply facilitate preparation of this specification and are not intended to suggest special meanings or functions. Therefore, the suffixes "module" and "unit" may be used interchangeably.

Figure 1:
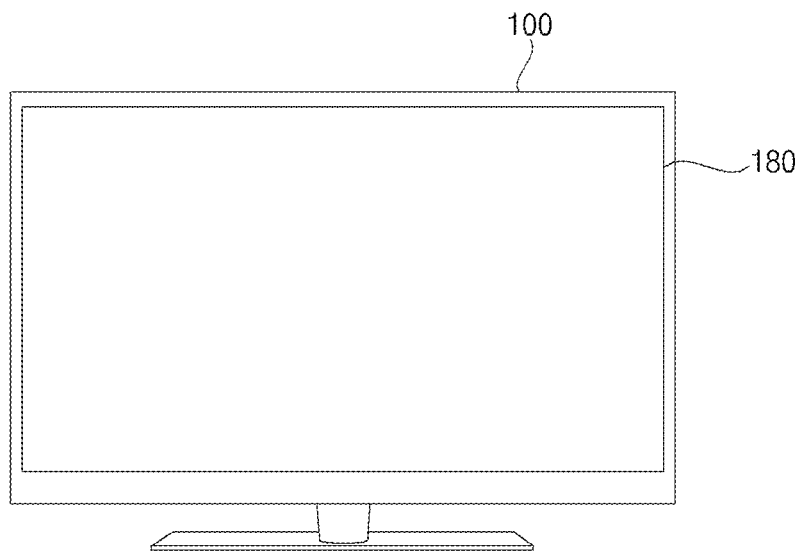
FIG. 1 is a view showing an outer appearance of an image display apparatus according to an embodiment of the present invention.

FIG. 1 is a view showing an outer appearance of an image display apparatus according to an embodiment of the present invention.

Referring to FIG. 1, an image display apparatus 100 according to an embodiment of the present invention may include a display module 180 and a controller 170 (see FIG. 2) for displaying an image on the display module.

Various techniques for improving sharpness in image display have been researched in the trend of increasing the resolution of the image display apparatus 100 to HD (High Definition), Full HD, UHD (Ultra High Definition) and the like.

As the resolution of the display module becomes higher, panels having RGBW pixels are used in addition to panels having RGB pixels.

Accordingly, the present invention proposes an image display apparatus capable of improving sharpness of an edge area for a high-frequency signal on an RGBW type panel.

According to an embodiment, an image display apparatus 100 may include a panel 210 having repeatedly arranged subpixels of RGBW and a timing controller 232 for converting an RGB video signal Vrgb into an RGBW video signal Vrgbw and generating, based on RGB data of a first pixel or BWR data of a third pixel, WRG data corresponding to a second pixel. When the luminance level of the second pixel is lower than or equal to a first reference level and the difference in luminance between the first pixel and the second pixel or between the second pixel and the third pixel is greater than or equal to a second reference level, the timing controller 232 sets the luminance level of the WRG data of the second pixel to the first level regardless of the RGB data of the first pixel or the BWR data of the third pixel. Thereby, sharpness of the edge area for a high-frequency signal may be improved on the RGBW type panel 210.

In the case of a white/black grill image, in which the first pixel and the third pixel are assigned white, and the second pixel and the fourth pixel are assigned black, the timing controller 232 may set the luminance levels of the WRG data of the second pixel and the GBW data of the fourth pixel to the first level regardless of the RGB data of the first pixel or the BWR data of the third pixel. Thereby, sharpness of the edge area for a high-frequency signal may be improved the RGBW type panel 210.

In the case of a white/black grill image, in which white is assigned to the first pixel and the third pixel, and black is assigned to the second pixel and the fourth pixel, the timing controller 232 may set the luminance levels of the RGB data of the first pixel and the BWR data of the third pixel to the second level higher than the first level regardless of the WRG data of the second pixel or the GBW data of the fourth pixel. Thereby, sharpness of the edge area for a high-frequency signal may be further improved.

Particularly, although subpixel rendering is performed, sharpness of the edge area of the grill pattern image may be improved.

According to another embodiment of the present invention, an image display apparatus 100 may include a panel 210 having repeatedly arranged RGBW subpixels, a timing controller 232 for converting an input RGB video signal into an RGBW video signal and generating WRG data corresponding to a second pixel based on RGB data of a first pixel or BWR data of a third pixel, and a grill processor 630 for setting, when the luminance level of the second pixel is lower than or equal to a first reference level and the difference in luminance between the first pixel and the second pixel or between the second pixel and the third pixel is greater than or equal to a second reference level, the luminance level of the WRG data of the second pixel to the first reference level regardless of the RGB data of the first pixel or the BWR data of the third pixel. Thereby, sharpness of an edge area for a high-frequency signal may be improved on the RGBW type panel 210.

In the case of a white/black grill image, in which white is assigned to the first pixel and the third pixel, and black is assigned to the second pixel and the fourth pixel, the grill processor 630 may set the luminance levels of the WRG data of the second pixel and the GBW data of the fourth pixel to the first level regardless of the RGB data of the first pixel or the BWR data of the third pixel. Thereby, sharpness of the edge area for a high-frequency signal may be improved the RGBW type panel 210.

In the case of a white/black grill image, in which white is assigned to the first pixel and the third pixel, and black is assigned to the second pixel and the fourth pixel, the grill processor 630 may set the luminance levels of the RGB data of the first pixel and the BWR data of the third pixel to a second level higher than the first level regardless of the WRG data of the second pixel or the GBW data of the fourth pixel. Thereby, sharpness of the edge area for a high-frequency signal may be further improved.

A technique for improving sharpness of the edge area in the image display operation of the image display apparatus described above will be described in more detail with reference to FIG. 5A and following figures.

Figure 2:
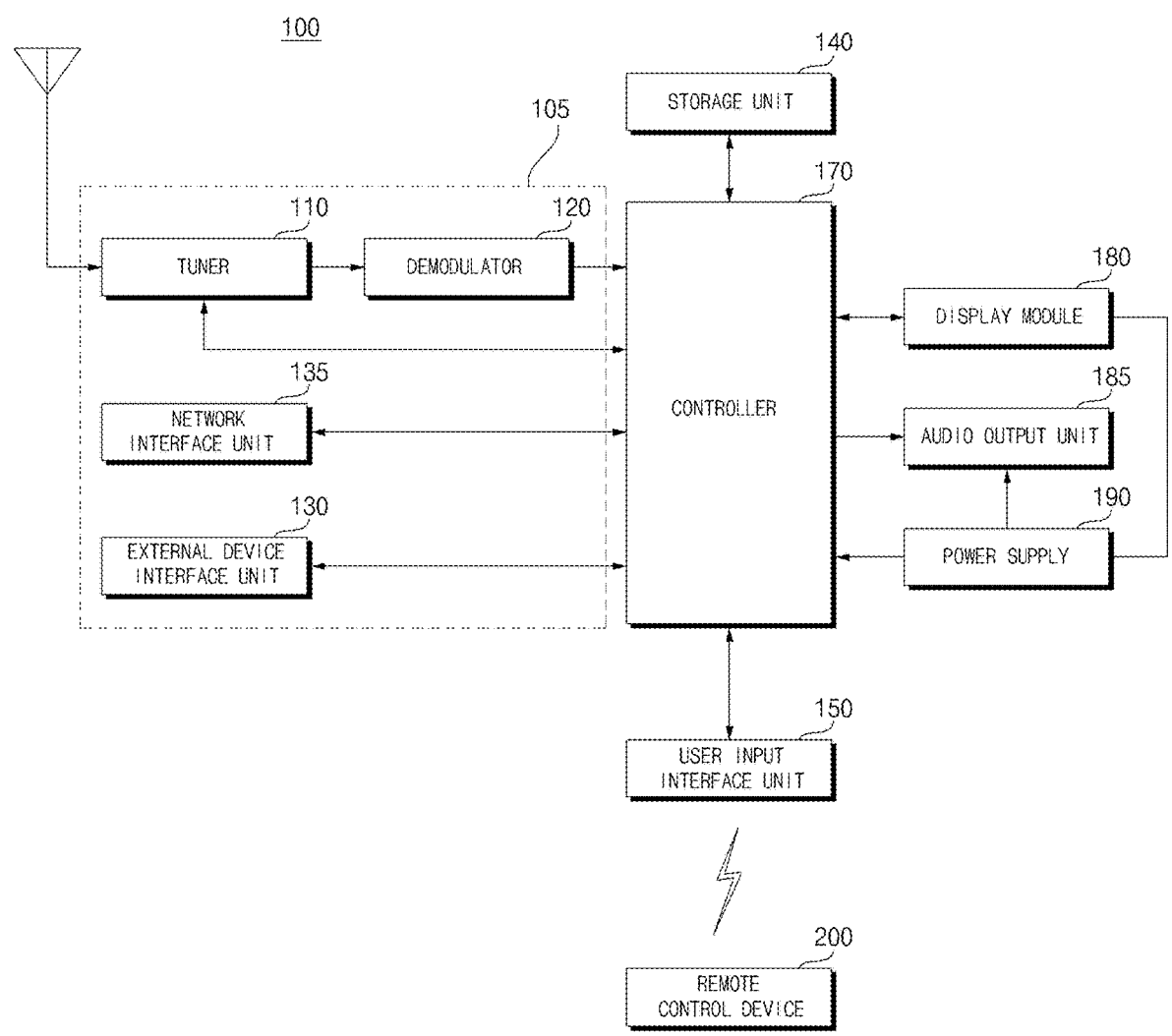
FIG. 2 is an internal block diagram illustrating the image display apparatus of FIG. 1.

FIG. 2 is an internal block diagram illustrating an image display apparatus according to an embodiment of the present invention.

Referring to FIG. 2, the image display apparatus 100 according to an embodiment may include a broadcast receiver 105, an external device interface unit 130, a storage unit 140, a user input interface unit 150, a sensor unit (not shown), a controller 170, a display module 180, and an audio output unit 185.

The broadcast receiver 105 may include a tuner 110, a demodulator 120, and a network interface unit 130. Of course, the broadcast receiver may be designed to include the tuner unit 110 and the demodulator unit 120 but not the network interface unit 130, if necessary. Alternatively, the broadcast receiver may be designed to include the network interface unit 130 but not include the tuner unit 110 and the demodulator unit 120.

Unlike the example of the figure, the broadcast receiver 105 may include an external device interface unit 135 (see FIG. 2). For example, a broadcast signal from the set-top box 250 of FIG. 1 can be received through the external device interface unit 135 (see FIG. 2).

The tuner 110 selects a radio frequency (RF) broadcast signal corresponding to a channel selected by a user or all pre-stored channels from among the RF broadcast signals received through an antenna 50. In addition, the tuner 110 converts the selected RF broadcast signal into an intermediate frequency signal, a base band image, or a voice signal.

For example, if the selected RF broadcast signal is a digital broadcast signal, the signal is converted into a digital IF (DIF) signal. If the selected RF broadcast signal is an analog broadcast signal, the signal is converted into a baseband image or a voice signal (CVBS/SIF). That is, the tuner 110 may process a digital broadcast signal or an analog broadcast signal. The analog baseband image or voice signal (CVBS/SIF) output from the tuner 110 may be directly input to the controller 170.

In this embodiment, the tuner 110 may sequentially select an RF broadcast signal for all stored broadcast channels from among RF broadcast signals received through the antenna through the channel memorization function, and convert the same into an intermediate-frequency signal, baseband image, or voice signal.

To receive broadcast signals of a plurality of channels, a plurality of tuners 110 may be provided. Alternatively, a single tuner to receive a plurality of channels simultaneously may be provided.

The demodulator 120 receives the digital IF signal DIF converted by the tuner 110 and performs a demodulation operation.

After performing demodulation and channel decoding, the demodulator 120 may output a stream signal TS. Herein, the stream signal may be a signal obtained by multiplexing an image signal, voice signal or data signal.

The stream signal output from the demodulator 120 may be input to the controller 170. After performing demultiplexing and image/voice signal processing, the controller 170 outputs an image to the display module 180 and a voice to the audio output unit 185.

The external device interface unit 130 may transmit or receive data to or from a connected external device 190. To this end, the external device interface unit 130 may include an A/V input/output unit (not shown) or a wireless communication unit.

The external device interface unit 130 may be connected to external devices such as a DVD (digital versatile disk), a Blu-ray, a gaming device, a camera, a camcorder, a computer (laptop), and a set-top box in a wired/wireless manner, and perform input/output operations with external devices.

The A/V input/output unit may receive image and voice signals input from an external device. Meanwhile, the wireless communication unit may perform short-range wireless communication with other electronic devices.

The network interface unit 135 provides an interface for connection with a wired/wireless network including the Internet. For example, the network interface unit 135 may receive content or data provided by a content provider or a network operator over a network.

The storage unit 140 may store programs for processing and control of signals in the controller 170, and also store a signal-processed image, voice signal or data signal.

The storage unit 140 may also function to temporarily store an image signal, a voice signal or a data signal input through the external device interface unit 130. In addition, the storage unit 140 may store information about a predetermined broadcast channel through the channel memorization function such as a channel map.

While it is illustrated in FIG. 2 that the storage unit 140 is provided separately from the controller 170, embodiments of the present invention are not limited thereto. The storage unit 140 may be provided in the controller 170.

The user input interface unit 150 may transmit a signal input by the user to the controller 170 or transmit a signal from the controller 170 to the user.

For example, the user input interface unit 150 may transmit/receive user input signals such as power on/off, channel selection, and screen window setting to/from the remote control device 200, deliver, to the controller 170, user input signals input through local keys (not shown) such as a power key, a channel key, a volume key, or a setting key, deliver, to the controller 170, user input signals input through a sensor unit (not shown) configured to sense gesture of the user, or transmit a signal from the controller 170 to the sensor unit (not shown).

The control unit 170 may demultiplex the input stream or process the demultiplexed signals through the tuner unit 110, the demodulator 120, or the external device interface unit 130 to generate and output a signal for outputting an image or sound.

An image signal image-processed by the controller 170 may be input to the display module 180 and an image corresponding to the image signal may be displayed. In addition, the image signal which is image-processed by the controller 170 may be input to an external output device through the external device interface unit 130.

A voice signal processed by the controller 170 may be output to the audio output unit 185 in the form of sound. In addition, the voice signal processed by the controller 170 may be input to an external output device through the external device interface unit 130.

Although not shown in FIG. 2, the controller 170 may include a demultiplexer and an image processor, which will be described with reference to FIG. 3 later.

Additionally, the controller 170 may control overall operation of the image display apparatus 100. For example, the controller 170 may control the tuner 110 to tune in RF broadcasting corresponding to a channel selected by the user or a pre-stored channel.

The controller 170 may control the image display apparatus 100 according to a user command input through the user input interface unit 150 or an internal program.

The controller 170 may control the display module 180 to display an image. Herein, the image displayed on the display module 180 may be a still image, a moving image, a 2D image, or a 3D image.

The controller 170 may control a 3D object for a predetermined 2D object in an image displayed on the display module 180 to be created and displayed. For example, the object may be at least one of an accessed web page (a newspaper, a magazine, etc.), an EPG (electronic program guide), various menus, a widget, an icon, a still image, a moving image and a text.

The 3D object may be processed to have a depth different from that of the image displayed on the display module 180. Preferably, the 3D object may be processed to appear protruding compared to the image displayed on the display module 180.

The controller 170 may recognize the position of the user based on the image captured by an image capture unit (not shown). For example, the distance (z-axis coordinate) between the user and the image display apparatus 100 may be identified. The x-axis coordinate and the y-axis coordinate in the display module 180 corresponding to the user position may also be identified.

Although not shown in the figure, a channel browsing processor for creating a thumbnail image corresponding to a channel signal or an external input signal may be further provided. The channel browsing processor may receive a stream signal TS output from the demodulator 120 or a stream signal output from the external device interface unit 130 and extract an image from the input stream signal to create a thumbnail image. The created thumbnail image may be stream-decoded together with a decoded image and input to the controller 170. The controller 170 may display a thumbnail list including a plurality of thumbnail images on the display module 180 using the input thumbnail image.

The thumbnail list may be displayed in a simple view mode in which the thumbnail list is displayed on a part of the display module 180 with a predetermined image displayed on the display module 180, or may be displayed in a full view mode in which the thumbnail list is displayed in most of the area of the display module 180. The thumbnail images in the thumbnail list may be sequentially updated.

The display module 180 generates drive signals by converting an image signal, data signal, OSD signal, and control signal processed by the controller 170 or an image signal, data signal and control signal received from the external device interface unit 130.

The display module 180 may be a PDP, A LCD display, OLED display, a flexible display, or a 3D display module.

In order to view three-dimensional images, the display module 180 may be divided into an additional display module system and a single display module system.

For the single display module system, the display module 180 may independently implement a 3D image without glasses or the like. Examples of the single display module may include a lenticular display module and a parallax barrier display module.

For the additional display module system, an additional display module may be used as a viewing device (not shown) in addition to the display module 180 to implement 3D images. Examples of the additional display module may include a head mount display module (HMD) and goggle type display module.

Goggle type display modules may be further divided into a passive type display module such as polarizing glass type display module and an active type display module such as a shutter glass type display module. HMD display modules may be divided into a passive type HMD and an active type HMD.

Meanwhile, the viewing device (not shown) may be 3D glass for stereoscopic viewing. The 3D glass (not shown) may include passive type polarizing glass or active type shutter glass, and may conceptually include the HMD type described above.

The display module 180 may be configured by a touchscreen to be used not only as an output device but also as an input device.

The audio output unit 185 receives a voice signal processed by the controller 170 and outputs voice.

The capture unit (not shown) captures an image of the user. The capture unit (not shown) may be implemented using one camera. However, embodiments of the present invention are not limited thereto. The capture unit (not shown) may be implemented using a plurality of cameras. The capture unit (not shown) may be buried in the upper portion of the display module 180 of the image display apparatus or may be separately disposed. Image information captured by the capture unit (not shown) may be input to the controller 170.

The controller 170 may sense gesture of the user based on an image captured by the capture unit (not shown), a sensed signal from the sensor unit (not shown), or a combination thereof.

The power supply 190 supplies power to overall parts of the image display apparatus 100. In particular, the power supply 190 may supply power to the controller 170, which may be implemented in the form of system on chip (SOC), the display module 180 for display of images, and the audio output unit 185 for outputting audio signals.

Specifically, the power supply 190 may include a converter to convert alternating current (AC) power into direct current (DC) power and a DC-DC converter to change the level of the DC power.

The remote control device 200 transmits a user input to the user input interface unit 150. To this end, the remote control device 200 may employ Bluetooth, radio frequency (RF) communication, infrared (IR) communication, ultra-wideband (UWB), or ZigBee. In addition, the remote control device 200 may receive an image signal, a voice signal or a data signal from the user input interface unit 150, and display or output the same.

The image display apparatus 100 may be a fixed or mobile digital broadcast receiver capable of receiving digital broadcast services.

The block diagram of the image display apparatus 100 shown in FIG. 2 is simply illustrative. Constituents of the block diagram may be integrated, added or omitted according to the specification of the image display apparatus 100 which is implemented in reality. That is, two or more constituents may be combined into one constituent, or one constituent may be subdivided into two or more constituents, when necessary. In addition, the function performed in each block is simply illustrative, and it should be noted that specific operations or devices of the blocks do not limit the scope of the present invention.

Unlike the example shown in FIG. 2, the video display apparatus 100 may not include the tuner unit 110 and the demodulator 120 shown in FIG. 2, but may receive and reproduce image content through the network interface unit 135 or an external device interface unit 130.

The image display apparatus 100 is an example of an image signal processing apparatus that performs signal processing of an image stored in the apparatus or an input image. Other examples of the image signal processing apparatus may include a set-top box without the display module 180 and the audio output unit 185 shown in FIG. 2, A DVD player, a Blu-ray player, a gaming device, and a computer.

Figure 3:
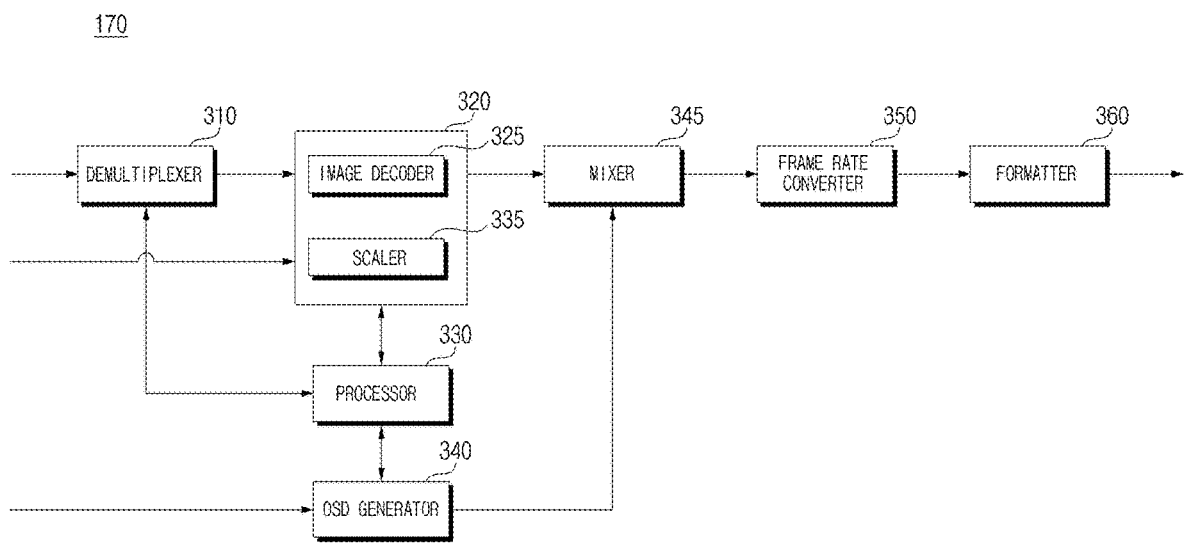
FIG. 3 is an internal block diagram illustrating the controller of FIG. 2.

FIG. 3 is an internal block diagram illustrating the controller of FIG. 2.

Referring to FIG. 3, the controller 170 according to an embodiment of the present invention may include a demultiplexer 310, an image processor 320, a processor 330, an OSD generator 340, a mixer 345, a frame rate converter 350, and a formatter 360. The controller 170 may further include an audio processor (not shown) and a data processor (not shown).

The demultiplexer 310 demultiplexes an input stream. For example, when MPEG-2 TS is input, the demultiplexer 310 may demultiplex the same to separate the stream into an image signal, a voice signal and a data signal. Herein, the stream signal input to the demultiplexer 310 may be a stream signal output from the tuner 110, the demodulator 120 or the external device interface unit 130.

The image processor 320 may perform image processing on the demultiplexed image signal. To this end, the image processor 320 may include an image decoder 325 and a scaler 335.

The image decoder 325 decodes the demultiplexed image signal, and the scaler 335 scales the resolution of the decoded image signal such that the image signal can be output through the display module 180.

The image decoder 325 may include decoders of various standards.

The image signal decoded by the image processor 320 may have only a 2D image signal, a combination of a 2D image signal and a 3D image signal, or only a 3D image signal.

For example, when an external image signal input from the external device 190 or a broadcast image signal in a broadcast signal received from the tuner 110 may have only a 2D image signal, a combination of a 2D image signal and a 3D image signal, or only a 3D image signal. Accordingly, the external image signal or the broadcast signal may be processed by the controller 170, particularly, the image processor 320 to output the 2D image signal, the combination of the 2D image signal and the 3D image signal, or the 3D image signal.

The image signals decoded by the image processor 320 may be 3D image signals of various formats. For example, the 3D image signal may include a color image and a depth image, or include a multi-view point image signals. The multi-view point image signal may include, for example, a left-eye image signal and a right-eye image signal.

Here, the format of the 3D image signal may include a side-by-side format in which the left-eye image signal L and the right-eye image signal R are arranged on left and right sides, a top/down format in which the left-eye image signal L and the right-eye image signal R are arranged on upper and lower sides, a frame sequential format in which the left-eye image signal L and the right-eye image signal R are arranged by time division, an interlaced format in which the left-eye image signal and the right-eye image signal are mixed line by line, a checker box format in which the left-eye image signal and the right-eye image signal are mixed box by box.

The processor 330 may control overall operation of the image display apparatus 100 or the controller 170. For example, the processor 330 may control the tuner 110 to tune in RF broadcasting corresponding to a channel selected by the user or a pre-stored channel.

In addition, the processor 330 may control the image display apparatus 100 according to a user command input through the user input interface unit 150 or an internal program.

The processor 330 may control data transmission with the network interface unit 135 or the external device interface unit 130.

The processor 330 may control operations of the demultiplexer 310, the image processor 320 and the OSD generator 340, which are in the controller 170.

The OSD generator 340 generates an OSD signal automatically or according to user input. For example, the OSD generator 340 may generate, based on a user input signal, a signal for displaying various kinds of information in the form of graphic images or texts on the screen of the display module 180. The generated OSD signal may contain various data including the user interface screen window of the image display apparatus 100, various menu screen windows, widget, and icons. The generated OSD signal may also contain a 2D object or a 3D object.

The OSD generator 340 may generate a pointer which can be displayed on the display module, based on a pointing signal input from the remote control device 200. In particular, the pointer may be generated by a pointing signal processor (not shown), and the OSD generator 340 may include the pointing signal processor. Of course, it is possible to provide the pointing signal processor (not shown) separately from the OSD generator 340.

The mixer 345 may mix the OSD signal generated by the OSD generator 340 and the decoded image signal image-processed by the image processor 320. Here, the OSD signal and the decoded image signal may include at least one of a 2D signal and a 3D signal. The mixed image signal is supplied to a frame rate converter (FRC) 350.

The FRC 350 may convert the frame rate of an input image. The frame rate converter 350 can output the frame rate without performing frame rate conversion.

The formatter 360 may arrange the left-eye image frame and the right-eye image frame of the frame rate-converted 3D image. Then, it may output a synchronizing signal Vsync for opening the left-eye glass and the right-eye glass of a 3D viewing device (not shown).

The formatter 360 may receive the mixed signal, that is, the OSD signal and the decoded video signal, from the mixer 345, and separate the same into the 2D image signal and the 3D image signal.

The formatter 360 may change the format of the 3D image signal. For example, it may change the format to any one of the various formats described above.

The formatter 360 may convert the 2D image signal into a 3D image signal. For example, the formatter 360 may detect an edge or a selectable object in the 2D image signal according to a 3D image generation algorithm, and separate and generate the object according to the detected edge of the selectable object as a 3D image signal. The generated 3D image signal may be separated into a left-eye image signal L and a right-eye image signal R to be aligned.

Although not shown in the figure, a 3D processor (not shown) for 3-dimensional effect signal processing may be further disposed after the formatter 360. The 3D processor (not shown) may perform processing such as adjustment of brightness, tint and color of an image signal to improve the 3D effect. For example, signal processing of making parts at a close distance sharp and making parts at a far distance blurred may be performed. Such function of the 3D processor may be integrated into the formatter 360 or the image processor 320.

An audio processor (not shown) in the controller 170 may process a demultiplexed voice signal. To this end, the audio processor (not shown) may include various decoders.

The audio processor (not shown) in the controller 170 may perform processing such as adjustment of bass, treble, and volume.

The data processor (not shown) in the controller 170 may perform data processing on a demultiplexed data signal. For example, if the demultiplexed data signal is a coded data signal, the data processor (not shown) may decode the data signal. The coded data signal may be electronic program guide (EPG) information containing broadcast information such as a start time and end time of a broadcast program broadcast on each channel.

While FIG. 3 illustrates that the signals from the OSD generator 340 and the image processor 320 are mixed in the mixer 345 and then 3D-processed in the formatter 360, embodiments of the present invention are not limited thereto. That is, the output of the image processor 320 may be 3D-processed by the formatter 360, and the OSD generator 340 may generate and 3D-processing an OSD signal. Then, the processed 3D signals may be mixed by the mixer 345.

The block diagram of the controller 170 shown in FIG. 3 is simply illustrative. Constituents of the block diagram may be integrated, added or omitted according to the specification of the controller 170 that is implemented in reality.

In particular, the FRC 350 and the formatter 360 may not be provided in the controller 170. Instead, they may be provided individually or provided as one separate module.

Figure 4:
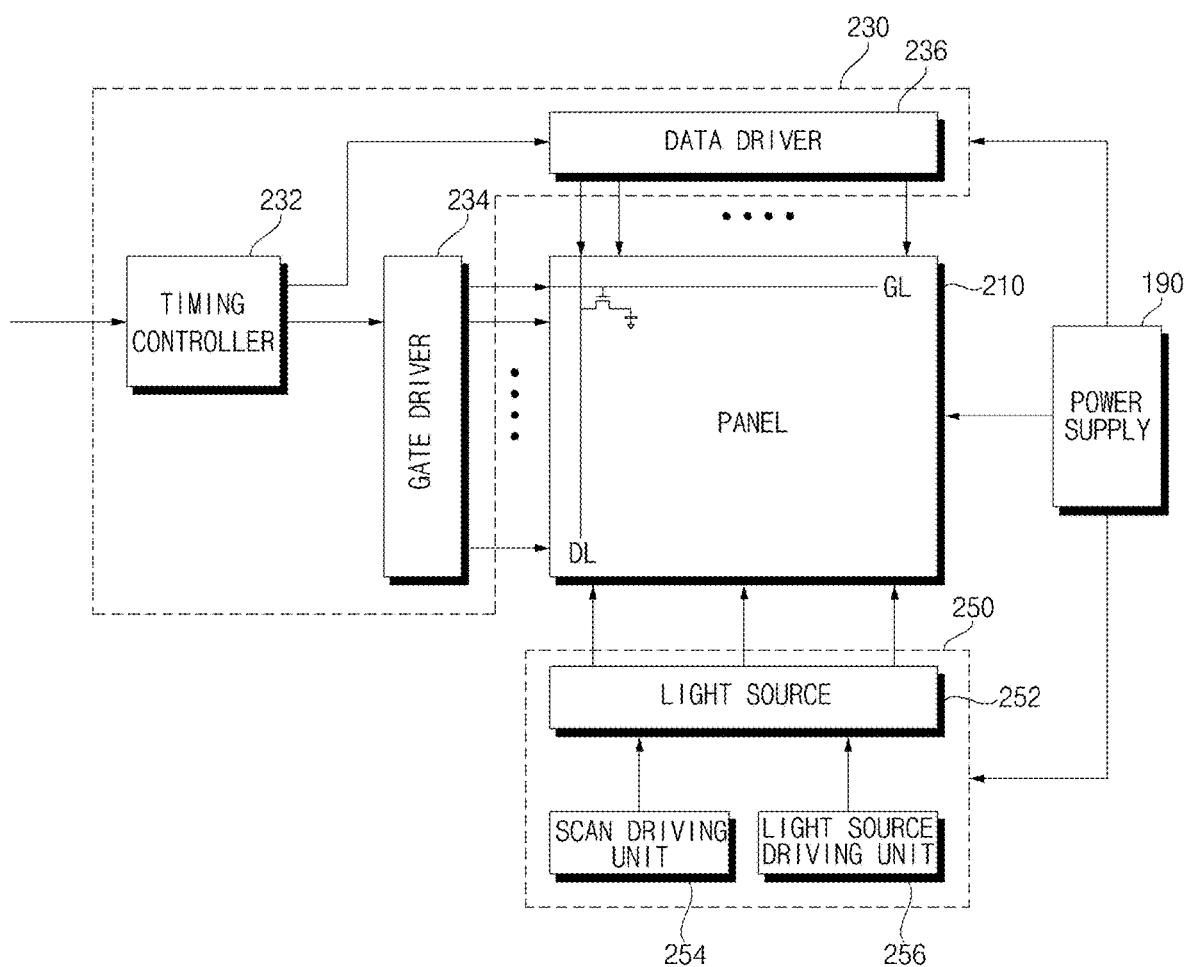
FIG. 4 is an example internal block diagram of the display module of FIG. 2.

FIG. 4 is an example internal block diagram of the display module of FIG. 2.

Referring to FIG. 4, the display 180, which is based on a liquid crystal display (LCD) panel, may include an LCD panel 210, a driver circuit unit 230, and a backlight unit 250.

To display images, the LCD panel 210 includes a first substrate on which a plurality of gate lines GL and data lines DL are arranged to intersect each other in a matrix form, and a thin film transistor and a pixel electrode connected thereto are formed in the areas of intersection, a second substrate including a common electrode, and a liquid crystal layer formed between the first substrate and the second substrate.

The driver circuit unit 230 drives the LCD panel 210 through a control signal and a data signal supplied from the control unit 170 of FIG. 1. To this end, the driver circuit unit 230 includes a timing controller 232, a gate driver 234, and a data driver 236.

The timing controller 232 receives a control signal, R, G, and B data signals and a vertical synchronization signal Vsync input from the control unit 170. The timing controller 232 controls the gate driver 234 and the data driver 236 according to the control signal, rearranges the R, G, and B data signals, and provides the rearranged R, G, and B data signals to the data driver 236.

A scanning signal and an image signal are supplied to the LCD panel 210 through the gate lines GL and the data lines DL under control of the gate driver 234, the data driver 236 and the timing controller 232.

The backlight unit 250 supplies light to the LCD panel 210. To this end, the backlight unit 250 may include a plurality of light source 252, a scan driving unit 254 for controlling the scanning operation of the light sources 252, and a light source driving unit 256 for turning on/off the light sources 252.

A predetermined image is displayed using the light emitted from the backlight unit 250 with the light transmittance of the liquid crystal layer adjusted by the electric field formed between the pixel electrode and the common electrode of the LCD panel 210.

The power supply 190 supplies a common electrode voltage Vcom to the LCD panel 210 and supplies a gamma voltage to the data driver 236. In addition, the power supply 190 may supply the backlight unit 250 with driving power for driving the light source 252.

Figure 5A:
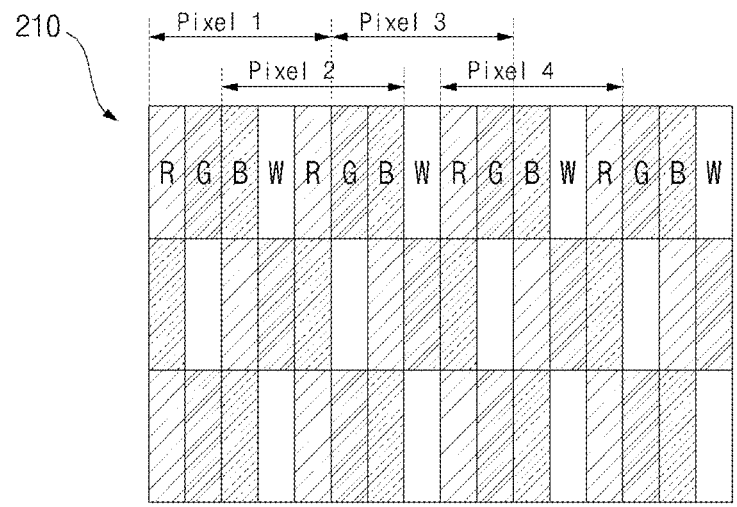
FIGS. 5A to 5C show various examples of the panel of FIG. 4.
Figure 5B:
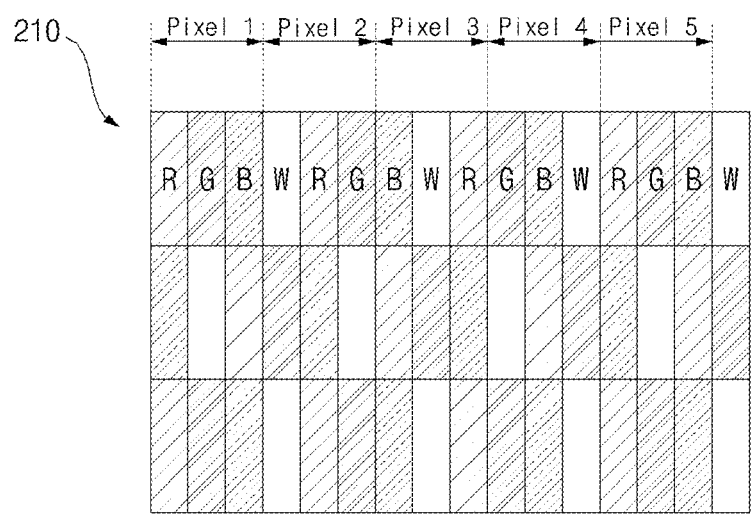
Figure 5C:
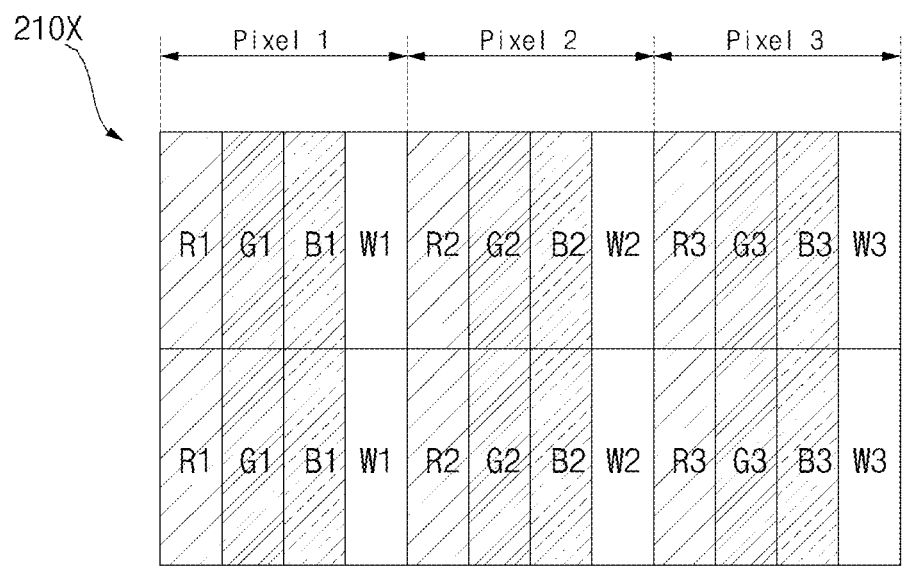

FIGS. 5A to 5C show various examples of the panel of FIG. 4.

First, FIG. 5A illustrates a panel 210 having RGBW subpixels arranged repeatedly in the horizontal direction.

Referring to FIG. 5A, in a first line, pixel 1 may have RGBWR subpixels, pixel 2 may have BWRGB subpixels, including the BWR subpixels of pixel 1, pixel 3 may have GBWRG subpixels, including the GB subpixels of pixel 2, and pixel 4 may have RGBWR subpixels, including the RG subpixels of pixel 3.

In a second line, subpixels may be arranged in order of BWRG.

That is, the RGBW subpixels of the pixels of FIG. 5A may partially overlap.

Next, FIG. 5B illustrates a panel 210 having RGBW subpixels repeatedly arranged in the horizontal direction.

Referring to FIG. 5B, in a first line, pixel 1 may have RGB subpixels, pixel 2 may have WRG subpixels, pixel 3 may have BWR subpixels, and pixel 4 may have GBW subpixels.

In a second line, subpixels may be arranged in order of BWRG.

That is, the pixels of FIG. 5B may have no overlapping RGBW subpixels.

Both the panel 210 of FIG. 5A and the panel 210 of FIG. 5B, which are RGBW type panels having RGBW subpixels, may differ from each other in distinguishing the pixels.

The present invention proposes a method of improving sharpness of an edge image when the display module 180 based on the panel 210 of FIG. 5B displays a grill pattern image. Details will be described with reference to FIG. 8 and following figures.

Next, FIG. 5C illustrates a WRGB-type panel 210x on which RGBW subpixels are sequentially arranged.

In particular, compared to the example of FIG. 5A, subpixels are arranged in order of RGBW on each line, and the pixels are have RGBW subpixels that do not overlap RGBW subpixels of the other pixels.

Figure 6:
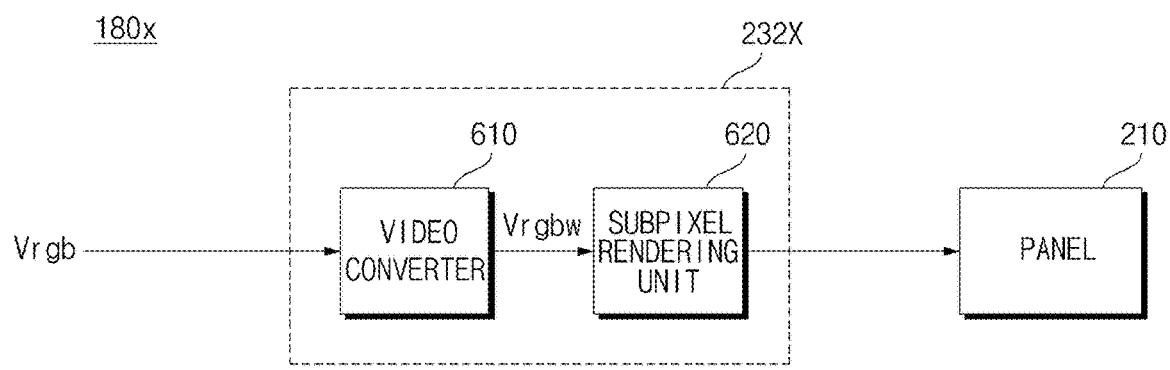
FIG. 6 is an example internal block diagram of a display module.

FIG. 6 is an example internal block diagram of a display module.

Referring to FIG. 6, a display module 180x may include a timing controller 232x and an RGBW type panel 210 as shown in FIG. 5A or 5B.

The timing controller 232x may include a video converter 610 for converting an RGB video signal Vrgb from the controller 170 into an RGBW video signal Vrgbw, and a subpixel rendering unit 620 for performing subpixel rendering on the RGBW video signal Vrgbw.

When subpixels are shared as shown in FIG. 5A, the subpixel rendering unit 620 may generate a new pixel value using a time difference or a filtering principle.

For example, the luminance value of a subpixel W may be generated using luminance values of neighboring subpixels such as RGB, and the luminance value of a subpixel R may be generated using the luminance values of neighboring subpixels such as WGB. The luminance value of a G subpixel may be generated using the luminance values of neighboring subpixels such as WRB and the luminance value of a subpixel of B may be generated using the luminance values of neighboring subpixels such as WRG.

The subpixel rendering unit 620 may generate a new pixel value for pixels which do not share subpixels as shown in FIG. 5B, using a time difference or a filtering principle.

For example, the luminance value of the subpixel W of the second pixel may be generated using the luminance value of the subpixel W of the third pixel neighboring the second pixel, and the luminance value of the subpixel R of the second pixel may be generated using the luminance value of the subpixels R of the first and third pixels neighboring the second pixel, and the luminance value of the subpixel G of the second pixel may be generated using the luminance value of the subpixel G of the first pixel neighboring the second pixel.

The panel 210 may display the subpixel-rendered RGBW video signal Vrgbw.

Such subpixel rendering exhibits an effect of low-pass filtering since it references refers to the luminance levels of neighboring subpixels. Thereby, sharpness of the edge area may be lowered.

Particularly, in the case of a white/black grill pattern image, in which white and black are repeated in each line, there arises a problem of lowered sharpness of the edge area. Similarly, in the case of a black/white grill pattern image, in which black and white are repeated in each line, there arises a problem of lowered sharpness of the edge area.

Accordingly, the present invention introduces a new concept of a grill processor in order to solve the problem of lowering of the sharpness of the edge area subpixel rendering. Details will be described with reference to FIGS. 7A to 7C.

Figure 7A:
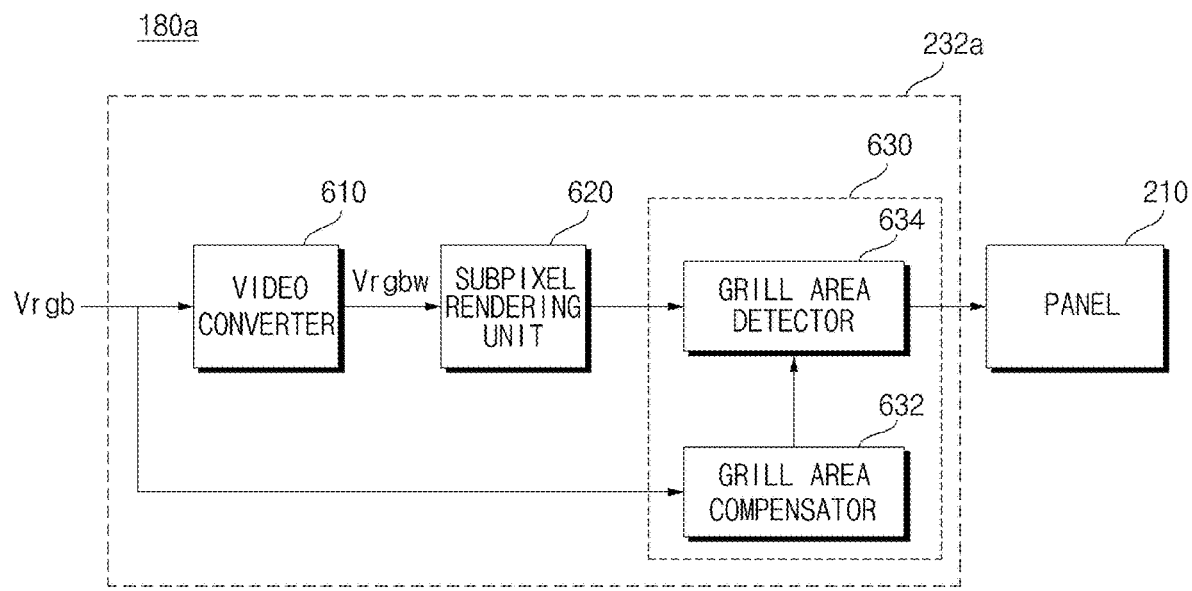
FIGS. 7A to 7C are example internal block diagrams of a display module according to embodiments of the present invention.
Figure 7B:
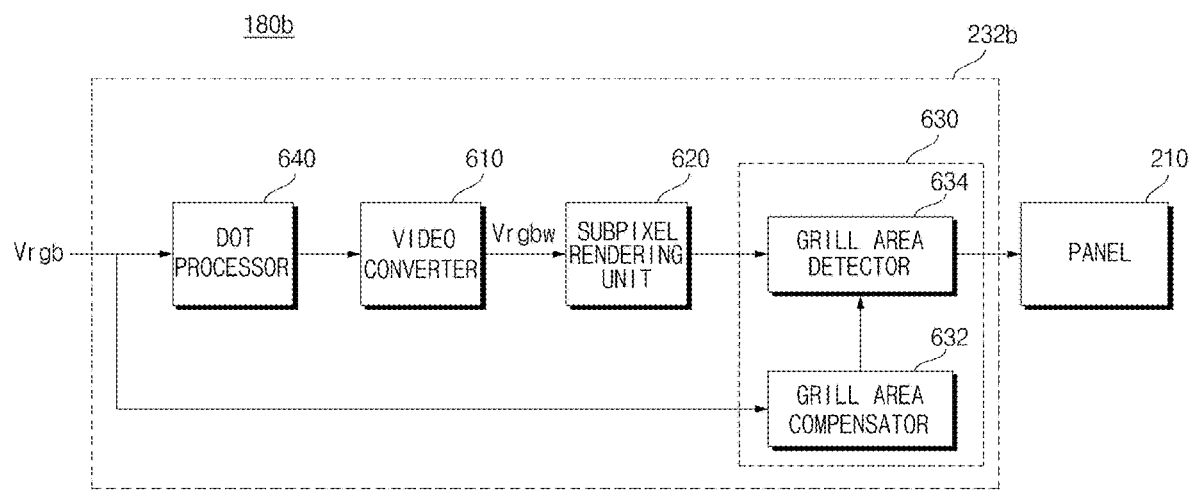
Figure 7C:
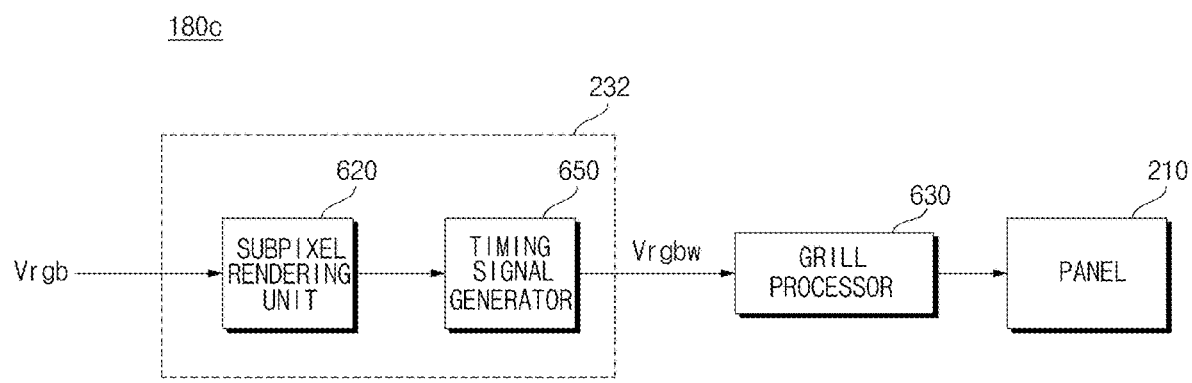

FIGS. 7A to 7C are example internal block diagrams of a display module according to embodiments of the present invention.

FIG. 7A is an internal block diagram of a display module according to an embodiment of the present invention, wherein the display module 180a may include a timing controller 232a and an RGBW type panel 210 as shown in FIG. 5B.

In the case of a white/black grill image, in which white is assigned to the first pixel and the third pixel, and black is assigned to the second pixel and the fourth pixel, the timing controller 232a may set the luminance levels of the WRG data of the second pixel and the GBW data of the fourth pixel to the first level regardless of the RGB data of the first pixel or the BWR data of the third pixel.

In the case of a white/black grill image, in which white is assigned to the first pixel and the third pixel, and black is assigned to the second pixel and the fourth pixel, the timing controller 232a may set the luminance levels of the RGB data of the first pixel and the BWR data of the third pixel to a second level higher than the first level regardless of the WRG data of the second pixel or the GBW data of the fourth pixel. Thereby, sharpness of the edge area for a high-frequency signal may be further improved.

In the case of a black/white grill image in which the first pixel and third pixel are assigned black, and the second pixel and the fourth pixel are assigned white, the timing controller 232a may set the luminance levels of the RGB data of the first pixel and the BWR data of the third pixel to a first level regardless of the luminance level of the WRG data of the second pixel or the GBW data of the fourth pixel.

In the case of a black/white grill image in which black is assigned to the first pixel and third pixel, and white is assigned to the second pixel and the fourth pixel, the timing controller 232a may set the luminance levels of the WRG data of the second pixel and the GBW data of the fourth pixel to a second level higher than the first level, regardless of the luminance level of the RGB data of the first pixel or the BWR data of the third pixel.

In the case of a color/black grill image, in which the first pixel and the third pixel are assigned one of red, green, and blue, and the second pixel and the fourth pixel are assigned black, the timing controller 232a may set the luminance levels of the WRG data of the second pixel and the GBW data of the fourth pixel to a first level regardless of the RGB data of the first pixel or the BWR data of the third pixel.

In the case of a color/black grill image, in which the first pixel and the third pixel are assigned one of red, green, and blue, and the second pixel and the fourth pixel are assigned black, the timing controller 232a may set the luminance levels of the RGB data of the first pixel and the BWR data of the third pixel to a third level higher than the first level regardless of the WRG data of the second pixel or the GBW data of the fourth pixel.

In the case of a black/color grill image, in which the first pixel and the third pixel are assigned black, and the second pixel and the fourth pixel are assigned one of red, green, and blue, the timing controller 232a may set the luminance levels of the RGB data of the first pixel and the BWR data of the third pixel to the first level regardless of the luminance level of the WRG data of the second pixel or the GBW data of the fourth pixel.

In the case of a black/color grill image, in which the first pixel and the third pixel are assigned black, and the second pixel and the fourth pixel are assigned one of red, green, and blue, the timing controller 232a may set the luminance levels of the WRG data of the second pixel and the GBW data of the fourth pixel to the third level higher than the first level regardless of the luminance level of the RGB data of the first pixel or the BWR data of the third pixel.

The timing controller 232a may include a video converter 610 for converting an RGB video signal Vrgb from the controller 170 into an RGBW video signal Vrgbw, a subpixel rendering unit 620 for performing subpixel rendering on the RGBW video signal Vrgbw, And a grill processor 630 for setting a luminance level of one of the pixel data of the first pixel and the pixel data of the second pixel in the RGBW video signal Vrgbw to a first level if the subpixel-rendered RGBW video signal Vrgbw is a video signal corresponding to a grill pattern image.

If the subpixel-rendered RGBW video signal Vrgbw is a video signal corresponding to a grill pattern image, the grill processor 630 may perform subpixel rendering compensation on the other one of the pixel data of the first pixel and the pixel data of the second pixel in the RGBW video signal Vrgbw.

In particular, if the subpixel-rendered RGBW video signal Vrgbw is a video signal corresponding to a grill pattern image, the grill processor 630 may set the luminance level of the other one of the pixel data of the first pixel and the pixel data of the second pixel in the RGBW video signal Vrgbw to a second level higher than the first level.

Specifically, the grill processor 630 may include a grill area detector 632 for detecting a grill pattern from the RGB video signal Vrgb, and a grill area compensator 634 for setting, when the grill pattern is detected, the luminance level of one of the pixel data of the first level and the pixel data of the second data in the grill pattern image to a first level.

The grill pattern image may be the white/black grill image described above.

For example, when an RGB video signal Vrgb for a white/black grill image is received from the controller 170, the video converter 610 converts the RGB video signal into an RGBW video signal Vrgbw for the white/black grill image.

Here, the luminance value for W may be calculated with reference to the luminance values of RGB.

The subpixel rendering unit 620 performs subpixel rendering on the RGBW video signal Vrgbw for the white/black grill image. That is, it may calculate the luminance of a corresponding pixel using the luminance of the surrounding subpixels or the like.

As described above, the RGBW video signal Vrgbw processed through the subpixel rendering unit 620 has an edge area whose sharpness has been lowered due to low-pass filtering.

When an input image detected through the grill area detector 632 is a white-black grill image in which the first pixel and the third pixel are assigned white and the second pixel and the fourth pixel are assigned black, the grill processor 630 performs sharpness compensation processing on the white/black grill image through the grill area compensator 634.

Specifically, the grill area compensator 634 may set the luminance of the pixel data of the second pixel corresponding to black of white and black to a first level. For example, the grill area compensator 634 may set the luminance of the pixel data of the second pixel to a specific level, such as level 0 or 3, among the luminance levels from 0 to 255. Accordingly, the luminance of the black area, which has been increased, is lowered by the subpixel rendering unit 620.

Further, the grill area compensator 634 performs signal processing such that the luminance of the pixel data of the first pixel corresponding to white of the white and black is increased. Since the luminance level is set with reference to the luminance level of the surrounding pixels by the subpixel rendering unit 620, the grill area compensator 634 may compensate the luminance level such that the luminance level can be raised.

Specifically, the grill area compensator 634 may set the luminance of the pixel data of the first pixel corresponding to white of white and black to a second level higher than the first level. For example, the grill area compensator 634 may set the luminance of the pixel data of the first pixel to a predetermined level, such as level 255 or level 253, among the luminance levels from 0 to 255. As a result, the luminance of the white area, which has been lowered, is increased by the subpixel rendering unit 620.

Accordingly, sharpness of the edge area for a high-frequency signal may be improved on the RGBW type panel 210.

If the subpixel-rendered RGBW video signal Vrgbw is a video signal corresponding to a second pattern image, the grill processor 630 may perform subpixel rendering compensation on the pixel data of the second pixel in the RGBW video signal Vrgbw and set the luminance of the pixel data of the first pixel in the RGBW video signal Vrgbw to a first level.

Specifically, when an input image detected through the grill area detector 632 is a black/white grill image in which the first pixel and the third pixel are assigned black and the second pixel and the fourth pixel are assigned white, the grill processor 630 performs sharpness compensation processing on the black/white grill image through the grill area compensator 634.

Specifically, the grill area compensator 634 may set the luminance of the pixel data of the second pixel corresponding to white of black and white to a predetermined level, such as level 255 or level 253, among the luminance levels from 0 to 255. As a result, the luminance of the white area, in which the luminance is lowered, is increased by the subpixel rendering unit 620. As a result, the luminance of the white area, which has been lowered, is increased by the subpixel rendering unit 620.

Further, the grill area compensator 634 performs signal processing such that the luminance of the pixel data of the first pixel corresponding to black of black and white is decreased. Since the luminance level is set with reference to the luminance level of the surrounding pixels by the subpixel rendering unit 620, the grill area compensator 634 may compensate the luminance level such that the luminance level can be lowered.

Specifically, the grill area compensator 634 may set the luminance of the pixel data of the first pixel corresponding to black of black and white to a specific level, such as level 0 or 3 among the luminance levels from 0 to 255. Accordingly, the luminance of the black area, which has been increased, is lowered by the subpixel rendering unit 620.

Accordingly, sharpness of the edge area for a high-frequency signal may be improved on the RGBW type panel 210.

Next, FIG. 7B is an internal block diagram of a display module according to another embodiment of the present invention, wherein the display module 180*b* may include a timing controller 232*b* and an RGBW type panel 210 as shown in FIG. 5B.

The display module 180*b* differs from the display module 180*a* of FIG. 7A in that the timing controller 232*b* in the display module 180*b* further includes a dot processor 640.

Figure 14A:
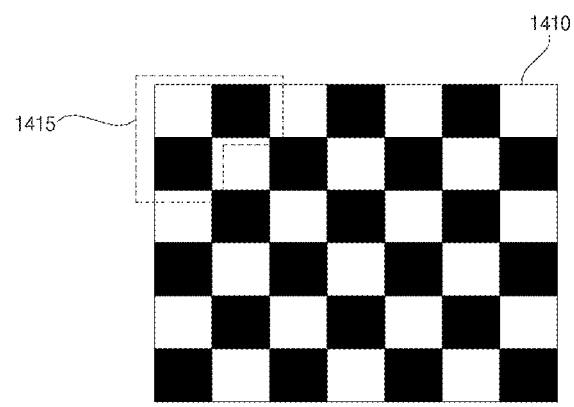
Figure 14B:
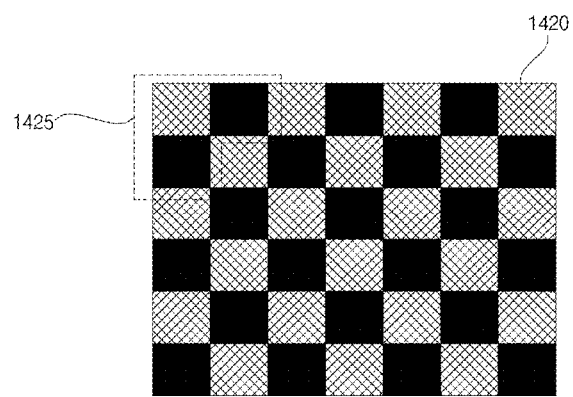

If the input image is a dot pattern image 1410, 1420 as shown in FIGS. 14A and 14B, rather than the white/black grill image which is a grill pattern image or the black/white grill image which is the second pattern image, the dot processor 640 may further perform relevant signal processing.

For example, the dot processor 640 may perform one-pixel shifting to the right on the video signals of even-numbered lines of the RGB video signal for the dot pattern image 1410, 1420.

Accordingly, the dot pattern image 1410, 1420 can be changed like a grill pattern image. The video converter 610, the subpixel rendering unit 620, and the grill processor 630 may perform operations as illustrated in FIG. 7A.

The grill processor 630 may further perform one-pixel shifting to the left on the video signals of the even-numbered lines of the RGBW video signal compensated by the grill area compensator 634.

Next, FIG. 7C is an internal block diagram of a display module according to another embodiment of the present invention, wherein the display module 180*c* may include a timing controller 232*c* and an RGBW type panel 210 as shown in FIG. 5B.

The display module 180*c* differs from the display module 180*a* of FIG. 7A in that the timing controller 232*c* in the display module 180*c* does not include the grill processor 630 but the grill processor 630 is arranged between the timing controller 232*c* and the panel 210.

That is, according to another embodiment of the present invention, the image display apparatus 100 may include a panel 210 having repeatedly arranged subpixels of RGBW, a timing controller 232 for converting an input RGB video signal Vrgb into an RGBW video signal Vrgbw and generating WRG data corresponding to a second pixel based on the RGB data of a first pixel or the BWR data of a third pixel, and a grill processor for setting, when the luminance level of the second pixel is lower than or equal to a first reference level and the difference in luminance between the first pixel and the second pixel or between the second pixel and the third pixel is greater than or equal to a second reference level, the luminance level of the WRG data of the second pixel to the first reference level regardless of the RGB data of the first pixel or the BWR data of the third pixel. Thereby, sharpness of an edge area for a high-frequency signal may be improved on the RGBW type panel 210.

In the case of a white/black grill image, in which white is assigned to the first pixel and the third pixel, and black is assigned to the second pixel and the fourth pixel, the grill processor 630 may set the luminance levels of the WRG data of the second pixel and the GBW data of the fourth pixel to the first level regardless of the RGB data of the first pixel or the BWR data of the third pixel.

In the case of a white/black grill image, in which white is assigned to the first pixel and the third pixel, and black is assigned to the second pixel and the fourth pixel, the grill processor 630 may set the luminance levels of the RGB data of the first pixel and the BWR data of the third pixel to a second level higher than the first level regardless of the WRG data of the second pixel or the GBW data of the fourth pixel.

In the case of a black/white grill image in which the first pixel and third pixel are assigned black, and the second pixel and the fourth pixel are assigned white, the grill processor 630 may set the luminance levels of the RGB data of the first pixel and the BWR data of the third pixel to a first level regardless of the luminance level of the WRG data of the second pixel or the GBW data of the fourth pixel.

In the case of a black/white grill image in which black is assigned to the first pixel and third pixel, and white is assigned to the second pixel and the fourth pixel, the grill processor 630 may set the luminance levels of the WRG data of the second pixel and the GBW data of the fourth pixel to a second level higher than the first level regardless of the luminance level of the RGB data of the first pixel or the BWR data of the third pixel.

In the case of a color/black grill image, in which the first pixel and the third pixel are assigned one of red, green, and blue, and the second pixel and the fourth pixel are assigned black, the grill processor 630 may set the luminance levels of the WRG data of the second pixel and the GBW data of the fourth pixel to a first level regardless of the RGB data of the first pixel or the BWR data of the third pixel.

In the case of a color/black grill image, in which the first pixel and the third pixel are assigned one of red, green, and blue, and the second pixel and the fourth pixel are assigned black, the grill processor 630 may set the luminance levels of the RGB data of the first pixel and the BWR data of the third pixel to a third level higher than the first level regardless of the WRG data of the second pixel or the GBW data of the fourth pixel.

In the case of a black/color grill image, in which the first pixel and the third pixel are assigned black, and the second pixel and the fourth pixel are assigned one of red, green, and blue, the grill processor 630 may set the luminance levels of the RGB data of the first pixel and the BWR data of the third pixel to the first level regardless of the luminance level of the WRG data of the second pixel or the GBW data of the fourth pixel.

In the case of a black/color grill image, in which the first pixel and the third pixel are assigned black, and the second pixel and the fourth pixel are assigned one of red, green, and blue, the grill processor 630 may set the luminance levels of the WRG data of the second pixel and the GBW data of the fourth pixel to the third level higher than the first level regardless of the luminance level of the RGB data of the first pixel or the BWR data of the third pixel.

Figure 8:
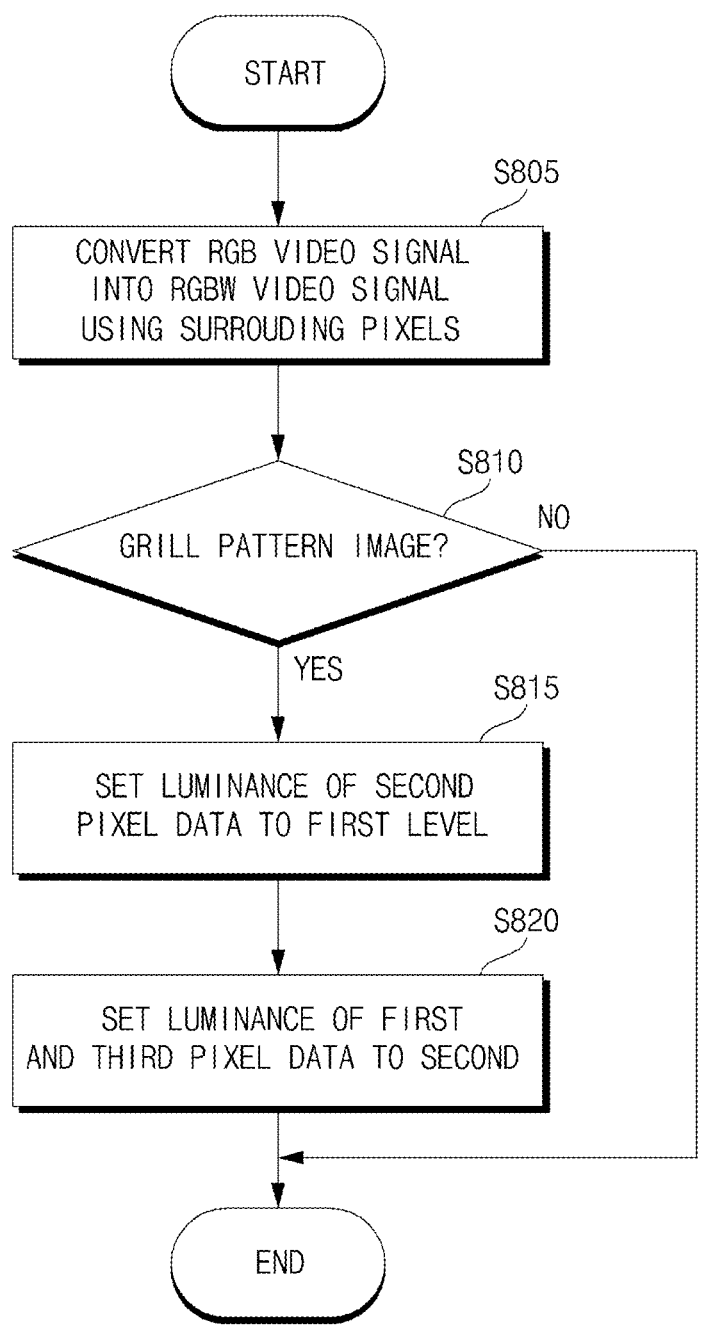
FIG. 8 is a flowchart illustrating operation of an image display apparatus according to an embodiment of the present invention.

FIG. 8 is a flowchart illustrating operation of an image display apparatus according to an embodiment of the present invention, and FIGS. 9A to 20B are reference diagrams for description of FIG. 8.

Referring to FIG. 8, an image display apparatus 100 according to an embodiment of the present invention, particularly a timing controller 232, converts an RGB video signal Vrgb into an RGBW video signal Vrgbw, and performs subpixel rendering on the RGBW video signal Vrgbw (S805).

That is, in subpixel rendering, the luminance of a subpixel is reset using surrounding pixels.

Next, the image display apparatus 100, particularly the timing controller 232, determines whether an input image is a grill pattern image (S815).

For example, the grill processor 630 in the timing control unit 232 may determine, based on the RGB video signal Vrgb, whether the input image is a grill pattern image.

Specifically, when the luminance level of the second pixel is lower than or equal to a first reference level and the difference in luminance between the first pixel and the second pixel or between the second pixel and the third pixel is greater than or equal to a second reference level, the grill area detector 632 in the grill processor 630 may determine that the input image is a white/black grill pattern image or a color/black grill pattern image.

Here, the first reference level may be a value corresponding to level 20 among the luminance levels from 0 to 255, and the second reference level may be a value corresponding to level 200.

when the luminance level of the first pixel is lower than or equal to the first reference level and the difference in luminance between the first pixel and the second pixel is greater than or equal to the second reference level, the grill area detector 632 in the grill processor 630 may determine that the input image is a black/white grill pattern image or a black/color grill pattern image.

Here, the first reference level may be a value corresponding to level 20 among the luminance levels from 0 to 255, and the second reference level may be a value corresponding to level 200.

Next, if the input image is a grill pattern image, the grill area compensator 634 in the grill processor 630 may set the luminance of the pixel data of the second pixel in the grill pattern image to a first level (S815).

For example, if the input image is a white/black grill image, the grill area compensator 634 may set the luminance of the pixel data of the second pixel corresponding to black of white and black to a specific level, such as level 0 or 3, among the luminance levels from 0 to 255. Accordingly, the luminance of the black area, which has been increased, is lowered by the subpixel rendering unit 620.

Next, the grill area compensator 634 in the grill processor 630 may compensate for subpixel rendering for the pixel data of the first pixel in the grill pattern image.

Specifically, the grill area compensator 634 in the grill processor 630 may set the luminance of the pixel data of the second pixel in the grill pattern image to a second level greater than the first level (S820).

For example, if the input image is a white/black grill image, the grill area compensator 634 may set the luminance of the pixel data of the first pixel corresponding to white of white and black to a predetermined level, such as level 255 or level 253, among the luminance levels from 0 to 255. As a result, the luminance of the white area, which has been lowered, is increased by the subpixel rendering unit 620.

Figure 9A:
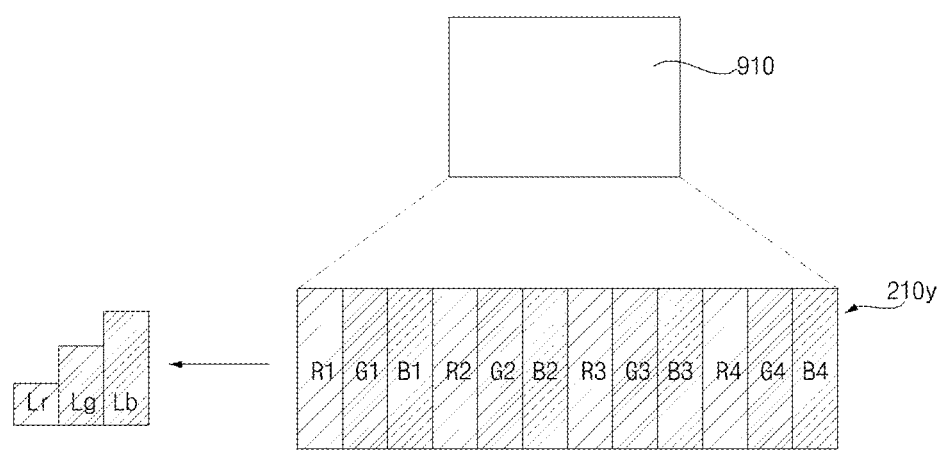
FIGS. 9A to 20B are reference diagrams for description of FIG. 8.
Figure 9B:
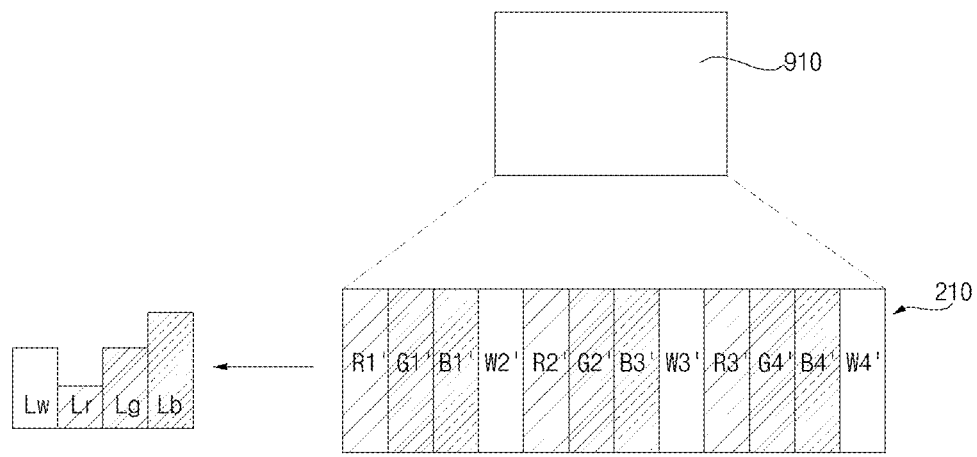

FIG. 9A is a diagram illustrating an example in which an image 910 that is not a grill pattern is displayed on an RGB type panel 210y. FIG. 9B is a diagram illustrating an example in which an image 910 is displayed on an RGBW type panel 210.

The video converter 610 in the timing control unit 232 may convert an RGB video signal Vrgb from the controller 170 into an RGBW video signal Vrgbw.

In this operation, the video converter 610 in the timing controller 232 may convert the RGB video signal Vrgb into the RGBW video signal Vrgbw such that the luminance Lr, Lg, Lb of the RGB pixels in FIG. 9A becomes the luminance Lr, Lg, Lb, Lw of the RGBW pixels in FIG. 9B.

Figure 9C:
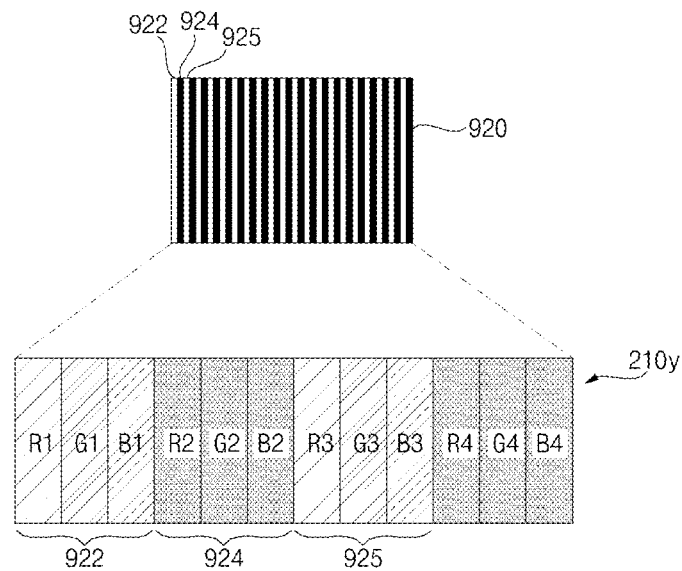
Figure 9D:
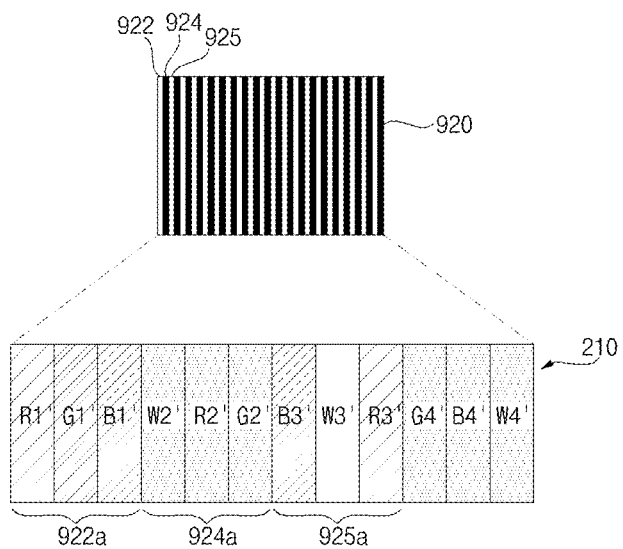

FIG. 9C is a diagram illustrating an example in which an white/black image 920 which is a grill pattern image is displayed on the RGB type panel 210y, and FIG. 9D is a diagram illustrating an example in which the white/black image 920 which is a grill pattern image is displayed on the RGBW type panel 210.

As described above, the white/black grill image 920 may be a white/black grill image.

FIG. 9C illustrates that R1G1B1 922, which is a first pixel is displayed in white, R2G2B2 924, which is the second pixel, is displayed in black, and R3G3B3 925, which is the third pixel, is displayed in white.

FIG. 9D illustrates that the first pixel 922a, R1'G1'B1', is displayed in white, the second pixel 924a, W2'R2'G2' is displayed in black, and the third pixel 925a, B3'W3'R3', is displayed in white.

Figure 10A:
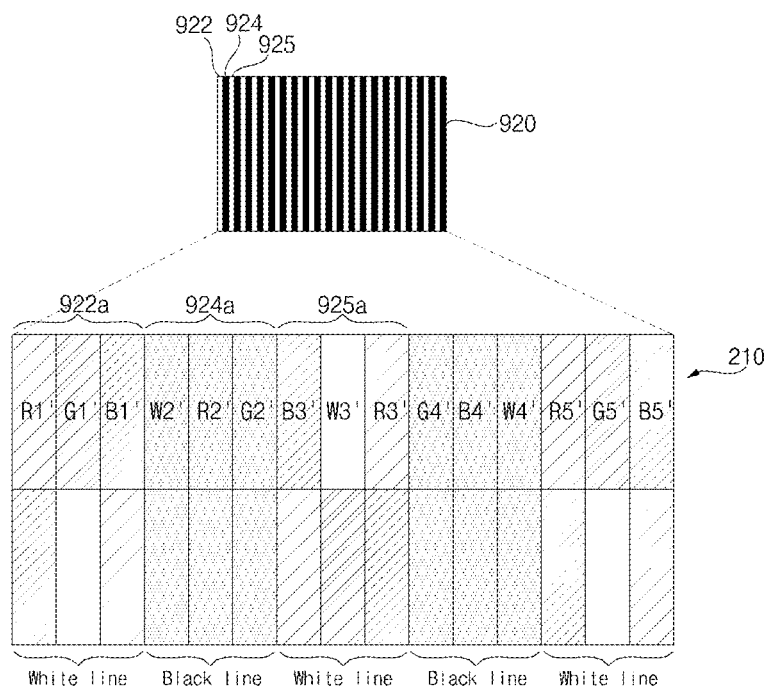
Figure 10B:
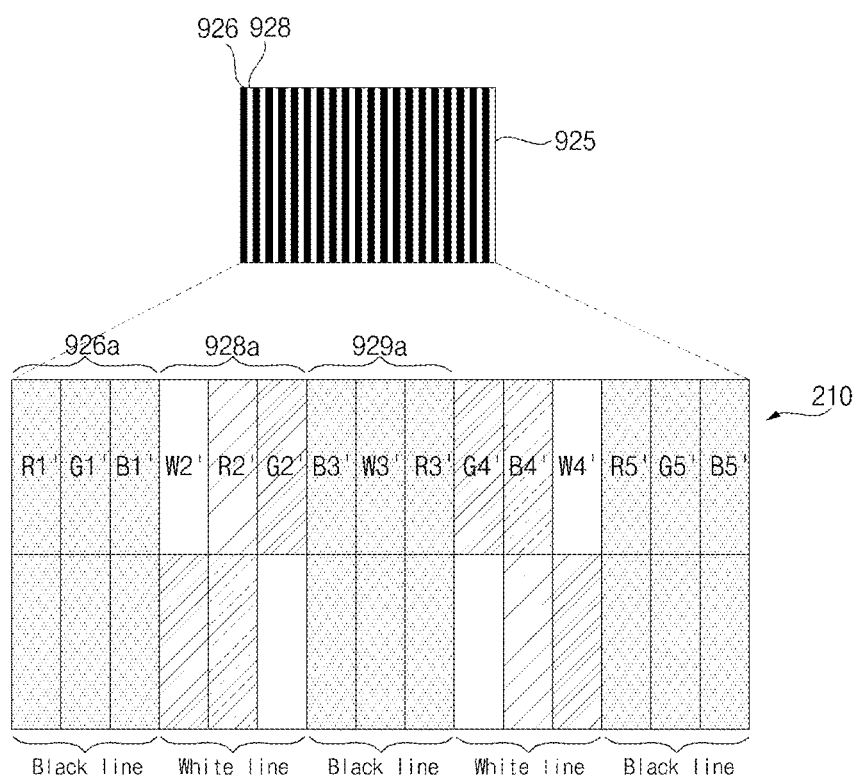

FIGS. 10A to 10B illustrate that the white/black grill image 920 and the black/white grill image 925 are respectively subpixel-rendered and displayed on the RGBW type panel 210.

The subpixel rendering unit 620 may reset the luminance of a corresponding subpixel using the luminance of the surrounding subpixels. That is, the subpixel luminance may be reset as shown in Equation 1 below.

$$W2'=W2'\times(1-k)+W3'\times k2$$

$$R2'=R1'\times k1+R2'\times(1-k1-k2)+R3'\times k2$$

$$G2'=G1'\times k+G2'\times(1-k) \quad \text{Equation 1}$$

Here, k1 and k2 correspond to predetermined weights.

When such subpixel rendering is performed on the white/black grill image, which is the white/black grill image 920, the black area, which is the pixel data of the second pixel, is displayed as black, which is not a sharp black but the luminance of which is partially increased, as shown in FIG. 10A.

The white area, which is the pixel data of the first pixel of the white/black grill image, is also displayed as white, which is not a sharp white but the luminance of which is partially reduced, as shown in FIG. 10A.

When subpixel rendering is performed on the black/white grill image, which is the black/white grill image 920, the white area, which is the pixel data of the second pixel, is displayed as white, which is not a sharp white but the luminance of which is partially reduced, as shown in FIG. 10B.

The black area, which is the pixel data of the first pixel of the black/white grill image, is also displayed as black, which is not a sharp black but the luminance of which is partially increased, as shown in FIG. 10B.

The present invention proposes a method of improving sharpness of the edge area for a pattern image, which is a high-frequency image, as shown in FIGS. 10A and 10B.

To this end, a grill processor 630 for detecting a grill pattern and performing compensation on the grill pattern is further disposed in the timing controller 232.

Figure 11A:
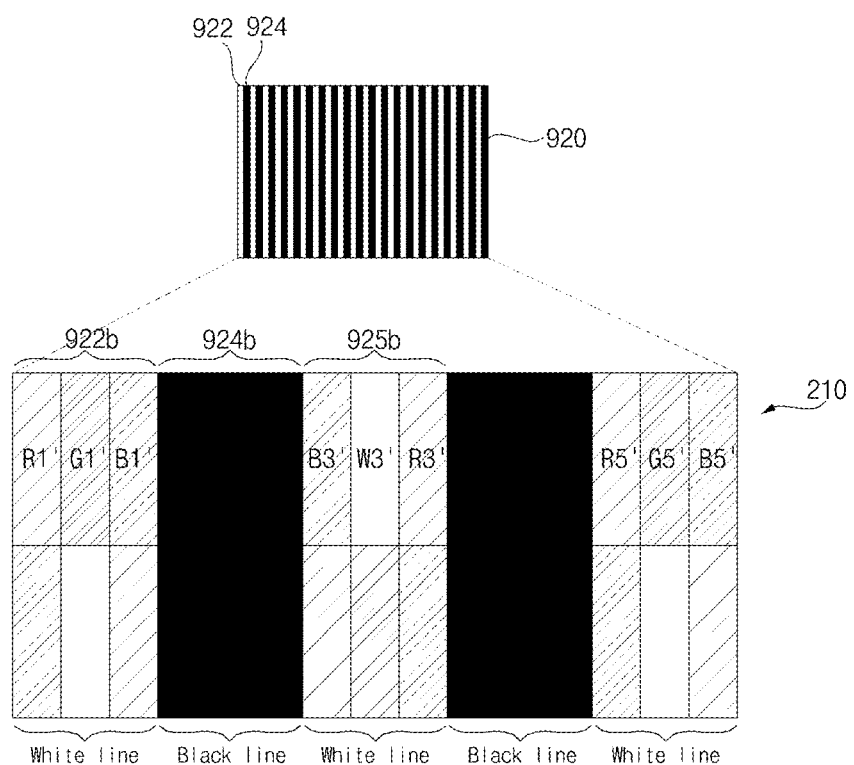

FIG. 11A illustrates a case where, in displaying a white/black grill image 920 in which the first pixel and the third pixel are assigned white, and the second pixel and the fourth pixel are assigned black, the grill processor 630 sets the luminance levels of the WRG pixel data 924b of the second pixel and the GBW data of the fourth pixel in the RGBW video signal Vrgbw to a first level regardless of the RGB data of the first pixel or the BWR data of the third pixel.

Specifically, the grill area compensator 634 may set the luminance of the WRG pixel data 924b of the second pixel corresponding to black of white and black to a specific level, such as level 0 or 3, among the luminance levels from 0 to 255. Accordingly, the luminance of the black area, which has been increased, is lowered by the subpixel rendering unit 620 as shown in FIG. 11A.

If the subpixel-rendered RGBW video signal Vrgbw is a video signal corresponding to a grill pattern image, the grill processor 630 may perform subpixel rendering compensation on the pixel data 924a of the first pixel in the RGBW video signal Vrgbw.

Specifically, the grill area compensator 634 may set the luminance of the RGB pixel data 924a of the first pixel corresponding to white of white and black to a second level, regardless of the WRG data of the second pixel or the GBW data of the fourth pixel.

That is, the grill area compensator 634 sets the luminance of the RGB pixel data 924a of the first pixel corresponding to white of white and black to a predetermined level, such as level 255 or level 253, among the luminance levels from 0 to 255. As a result, the luminance of the white area, which has been lowered, is increased by the subpixel rendering unit 620.

Accordingly, sharpness of the edge area for a high-frequency signal may be improved on the RGBW type panel 210.

Figure 11B:
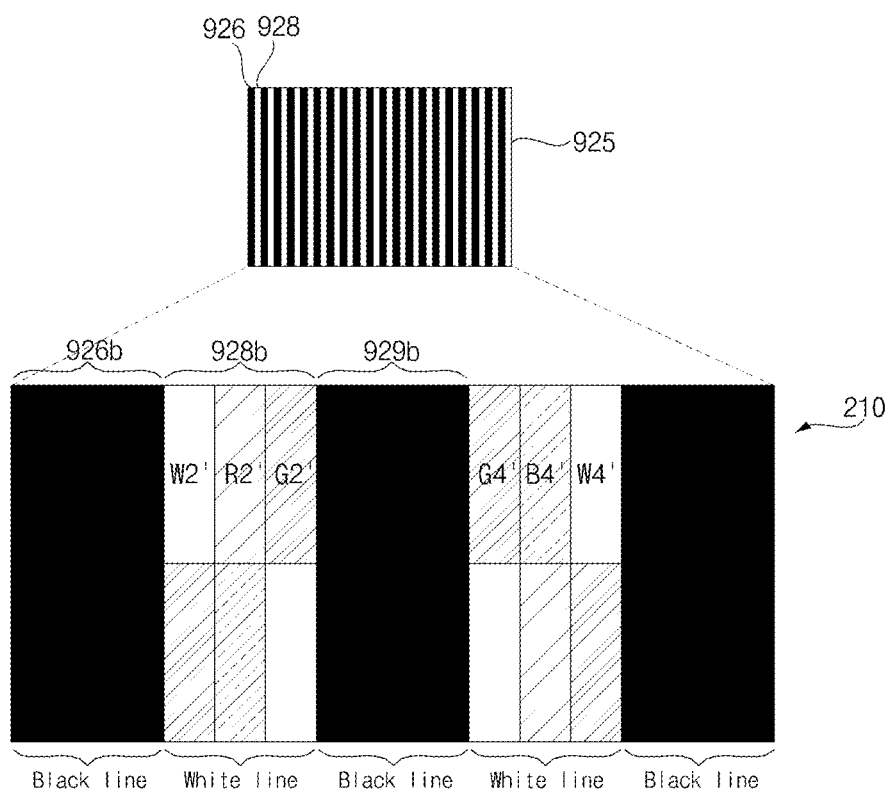

FIG. 11B illustrates a case, in displaying a white/black grill image 920 in which the first pixel and the third pixel are assigned black and the second pixel and the fourth pixel are assigned white, the grill processor 630 performs subpixel rendering compensation on the pixel data 928b of the second pixel in the RGBW video signal Vrgbw and sets the luminance of the pixel data 928a of the first pixel in the RGBW video signal Vrgbw to a first level.

That is, the grill area compensator 634 may set the luminance levels of the RGB pixel data 924a of the first pixel corresponding to white of white and black and the BWR data of the third pixel to the first level, regardless of the WRG data of the second pixel or the GBW data of the fourth pixel.

In the case of a black/white grill image in which the first pixel and third pixel are assigned black, and the second pixel and the fourth pixel are assigned white, the grill area compensator 634 may set the luminance levels of the WRG data of the second pixel and the GBW data of the fourth pixel to a second level higher than the first level, regardless of the luminance level of the RGB data of the first pixel or the BWR data of the third pixel.

Specifically, the grill area compensator 634 sets the luminance levels of the RGB pixel data 924a of the first pixel and the BWR data of the third pixel corresponding to white of white and black to a predetermined level, such as level 0 or 3, among the luminance levels from 0 to 255. Accordingly, the luminance of the black area, which has been increased, is lowered by the subpixel rendering unit 620 as shown in FIG. 11B.

Meanwhile, the grill area compensator 634 sets the luminance of the pixel data of the second pixel corresponding to white of black and white to a predetermined level, such as level 255 or level 253, among the luminance levels from 0 to 255. Accordingly, the luminance of the white area, which has been lowered, is increased by the subpixel rendering unit 620 as shown in FIG. 11B.

Accordingly, sharpness of the edge area for a high-frequency signal may be improved on the RGBW type panel 210.

Figure 11C:
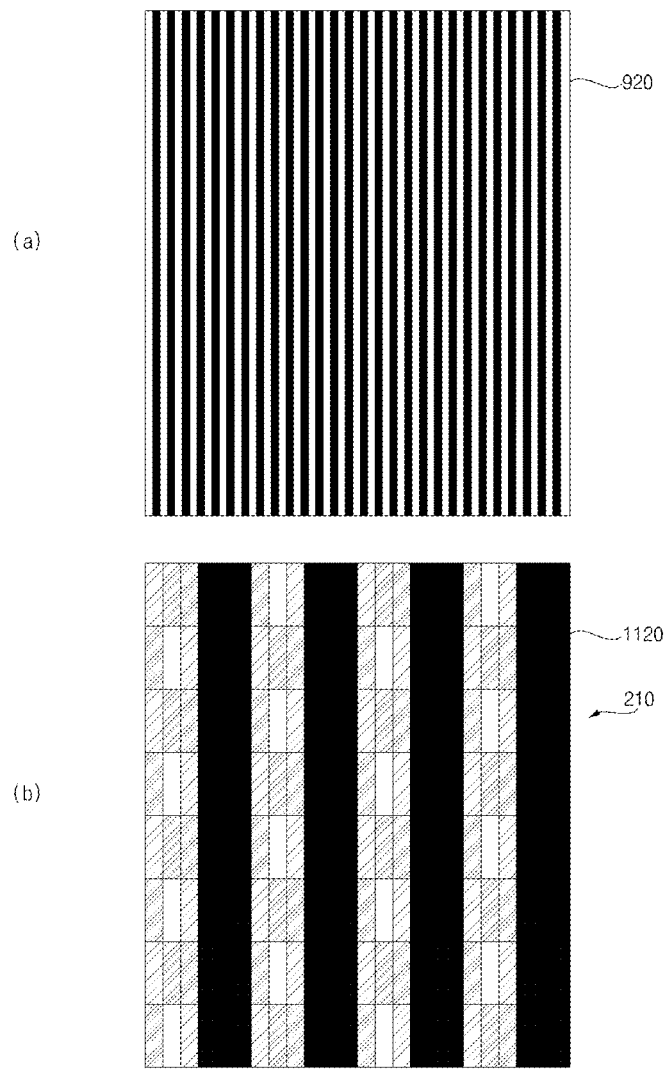

Similar to FIG. 11A, FIG. 11C illustrates a case where a white/black grill image 920 is displayed on the entire panel 210, and subpixel rendering compensation is performed by the grill processor 630.

Figure 11D:
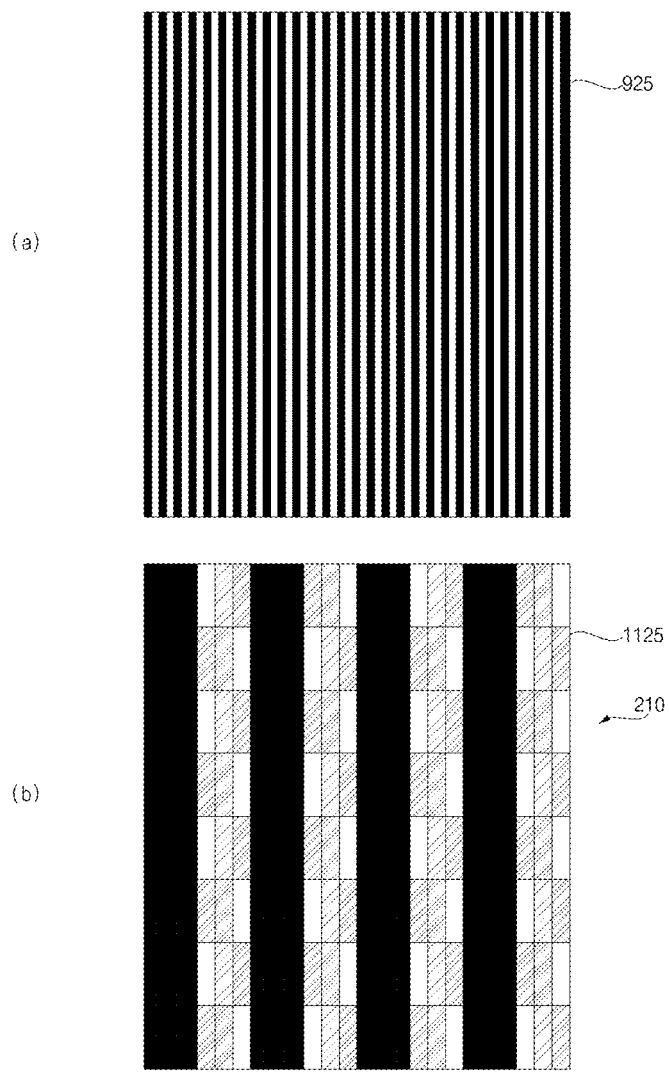

Similar to FIG. 11B, FIG. 11D illustrates a case where a black/white grill image 925 is displayed on the entire panel 210, and subpixel rendering compensation is performed by the grill processor 630.

Figure 12:
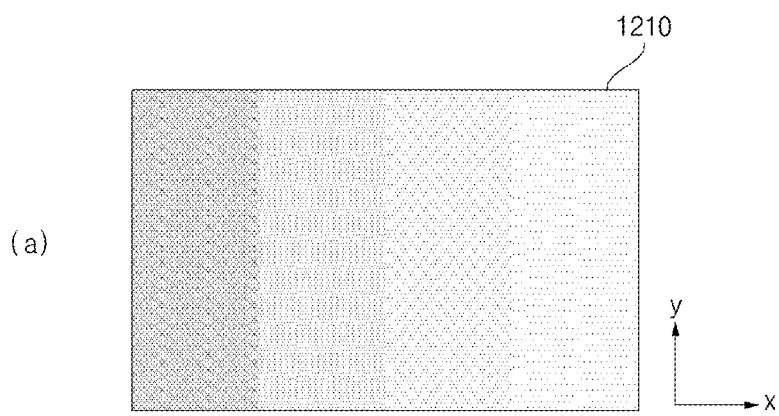
Figure 12:
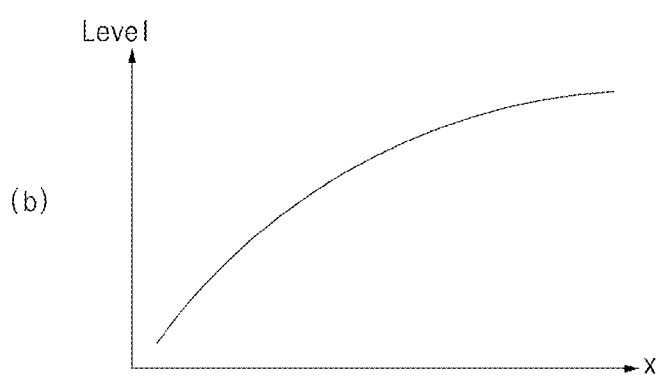
Figure 12:
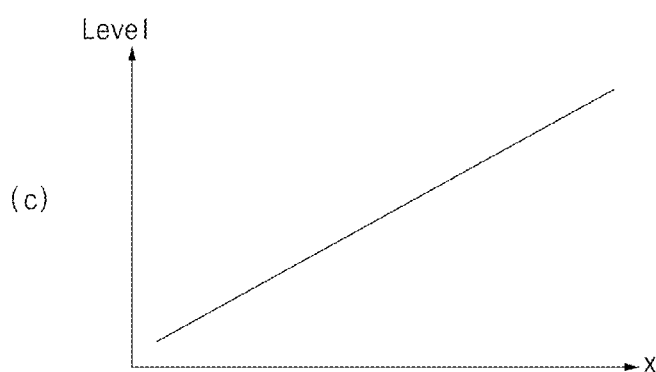

FIG. 12 is a reference diagram for explaining the luminance level after subpixel rendering of FIG. 12(*b*) for a predetermined image 1210 of FIG. 12(*a*) which is neither a grill pattern image nor a dot pattern image.

As shown in FIG. 12(*c*), in the image 1210 having luminance increasing along the x-axis, when the subpixel rendering unit 620 performs subpixel rendering, the luminance increase rate is varied due to influence of surrounding pixels as shown in FIG. 12(*b*).

Particularly, since low-pass filtering is performed by subpixel rendering, sharpness of the edge area is lowered, and the luminance increase rate decreases sequentially along the x-axis.

In the present invention, subpixel rendering is performed by the subpixel rendering unit 620 in the case of an image other than the grill pattern image and the dot pattern image. However, subpixel rendering compensation is not performed by the grill processor 630.

Accordingly, if the image is not a high-frequency image, it may be smoothly displayed according to the RGBW type panel 210.

That is, the image display apparatus 100 according to another embodiment includes a controller 170 for outputting an RGB video signal Vrgb, a panel 210 having RGBW pixels, and a timing controller 232 for converting the RGB video signal Vrgb into an RGBW video signal Vrgbw and outputting the converted video signal. If the RGB video signal Vrgb is not a grill pattern image, the timing controller 232 may perform a control operation such that subpixel rendering is performed. If the RGB video signal Vrgb is a grill pattern image, the timing controller 232 may set the luminance of the pixel data of the second pixel in the RGBW video signal Vrgbw to a first level. Thereby, sharpness of the edge area for a high-frequency signal may be improved on the RGBW type panel 210.

The above-described grill pattern image may include a color/black grill image in addition to a white/black grill image, or include a black/color grill image in addition to a black/white grill image.

Figure 13A:
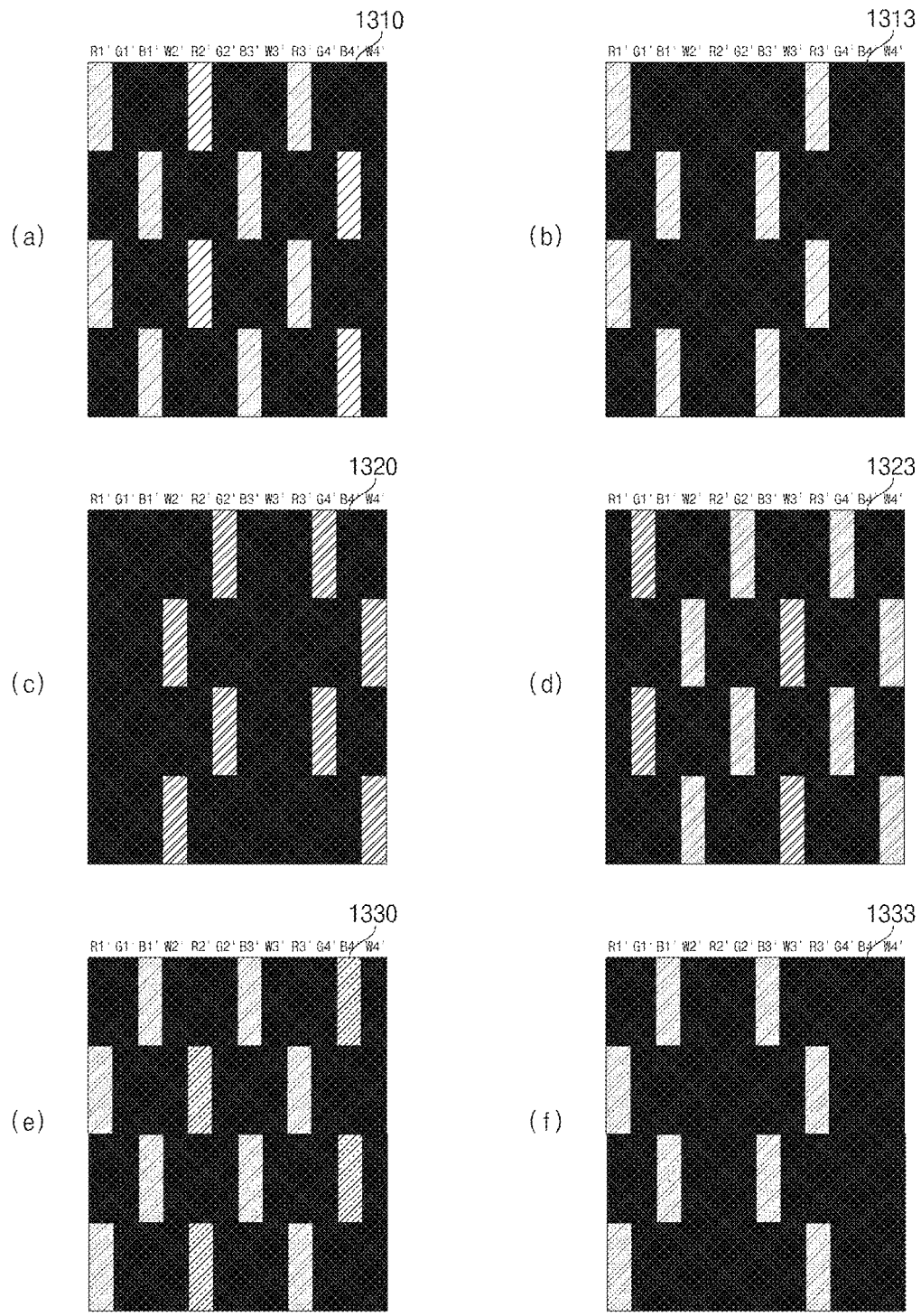

FIG. 13A illustrates a case where the compensation is not performed for the black/color grill image and the color/black grill image by the grill processor 630.

FIGS. 13A(a) and 13A(b) illustrate that a black/red grill image 1310 and a red/black grill image 1313 are displayed, but a part thereof has an edge area whose sharpness is low due to subpixel rendering.

FIGS. 13A(c) and 13A(d) illustrate that a black/green grill image 1320 and a green/black grill image 1323 are displayed, but a part thereof has an edge area whose sharpness is low due to subpixel rendering.

FIGS. 13A(e) and 13A(f) illustrate that a black/blue grill image 1330 and a blue/black grill image 1333 are displayed, but a part thereof has an edge area whose sharpness is low due to subpixel rendering.

Figure 13B:
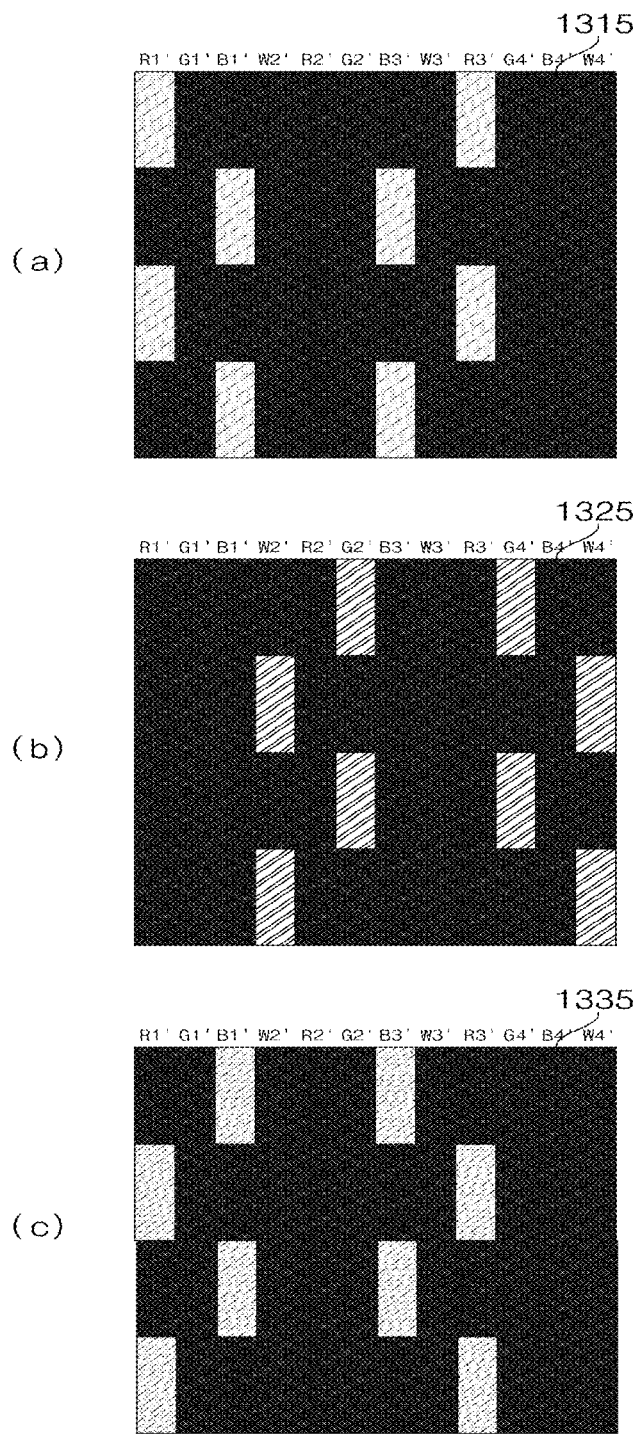

Next, FIG. 13B illustrates a case where subpixel rendering compensation is performed for the black/color grill image and the color/black grill image by the grill processor 630.

In the case of a color/black grill image, in which the first pixel and the third pixel are assigned one of red, green, and blue, and the second pixel and the fourth pixel are assigned black, the grill processor 630 may set the luminance levels of the WRG data of the second pixel and the GBW data of the fourth pixel to a first level regardless of the RGB data of the first pixel or the BWR data of the third pixel.

In the case of a color/black grill image, in which the first pixel and the third pixel are assigned one of red, green, and blue, and the second pixel and the fourth pixel are assigned black, the grill processor 630 may set the luminance levels of the RGB data of the first pixel and the BWR data of the third pixel to a third level higher than the first level regardless of the WRG data of the second pixel or the GBW data of the fourth pixel.

In the case of a black/color grill image, in which the first pixel and the third pixel are assigned black, and the second pixel and the fourth pixel are assigned one of red, green, and blue, the grill processor 630 may set the luminance levels of the RGB data of the first pixel and the BWR data of the third pixel to the first level regardless of the luminance level of the WRG data of the second pixel or the GBW data of the fourth pixel.

In the case of a black/color grill image, in which the first pixel and the third pixel are assigned black, and the second pixel and the fourth pixel are assigned one of red, green, and blue, the grill processor 630 may set the luminance levels of the WRG data of the second pixel and the GBW data of the fourth pixel to the third level higher than the first level regardless of the luminance level of the RGB data of the first pixel or the BWR data of the third pixel.

FIG. 13B(a) illustrates a case where the grill processor 630 sets the luminance level of the black area to the first level in a red/black grill image 1315. Thus, sharpness of the edge area is improved.

FIG. 13B(b) illustrates a case where the grill processor 630 sets the luminance level of the black area to the first level in a green/black grill image 1325. Thus, sharpness of the edge area is improved.

Next, FIG. 13B(c) illustrates a case where the grill processor 630 sets the luminance level of the black area to the first level in a blue/black grill image 1335. Thus, sharpness of the edge area is improved.

FIG. 14A illustrates a black/white dot pattern image 1410, and FIG. 14B illustrates a color/black dot pattern image 1420.

As described above, the dot processor 640 of FIG. 7B determines whether an input image is in a dot pattern. If the input image is in a dot pattern, the dot processor 640 may perform one-pixel shifting to the right on the video signals of even-numbered lines of the RGB video signal for the dot pattern image 1410, 1420.

Accordingly, the dot pattern image 1410, 1420 can be changed like a grill pattern image. The video converter 610, the subpixel rendering unit 620, and the grill processor 630 may perform operations as illustrated in FIG. 7A.

The grill processor 630 may further perform one-pixel shifting to the left on the video signals of the even-numbered lines of the RGBW video signal compensated by the grill area compensator 634.

Figure 15A:
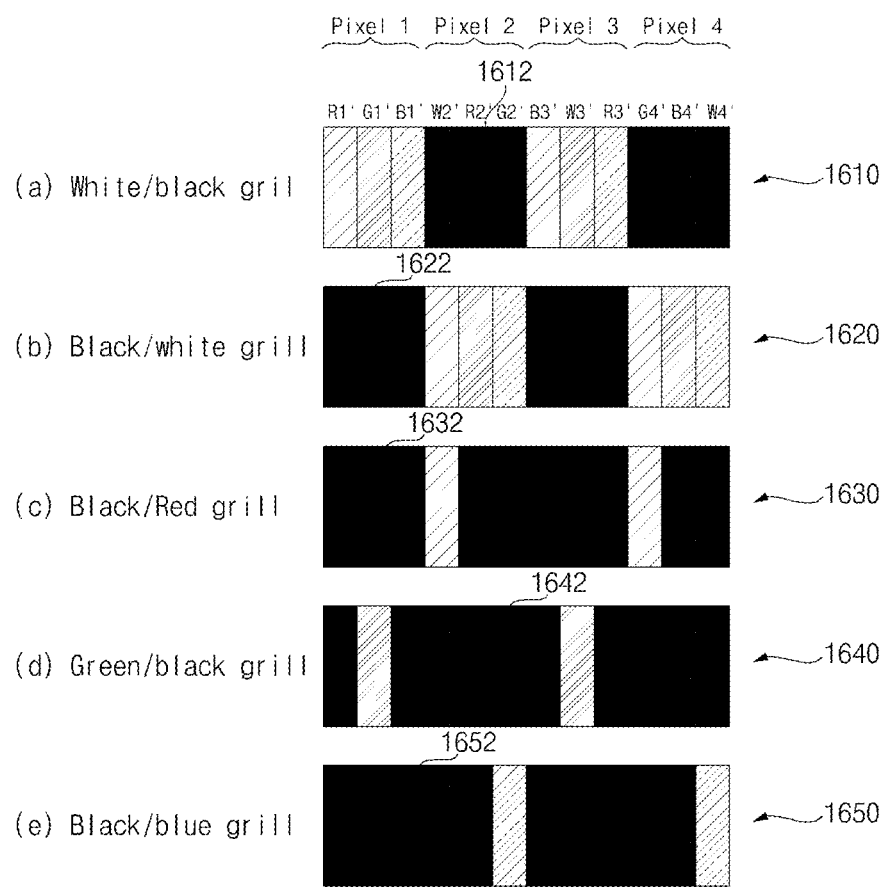

FIG. 15A illustrates a case where the grill processor 630 performs subpixel rendering compensation such as level fixing when the grill processor 630 is placed in the timing control unit 232*a*, 232*b* shown in FIG. 7A or 7B.

As shown in FIG. 15A(a), when the input image is a white/black grill pattern image 1610, the luminance levels of a second pixel (pixel 2) and a fourth pixel (pixel 4) are set to a first level. Thereby, sharpness of the second pixel area 1612 and the like is improved.

As shown in FIG. 15A(b), when the input image is a black/white grill pattern image 1620, the luminance levels of a first pixel (pixel 1) and a third pixel (pixel 3) are set to the first level. Thereby, sharpness of the first pixel area 1612 and the like is improved.

As shown in FIG. 15A(c), when the input image is a black/red grill pattern image 1630, the luminance levels of a first pixel (pixel 1) and a third pixel (pixel 3) are set to the first level. Thereby, sharpness of a first pixel area 1632 and the like is improved.

As shown in FIG. 15A(d), when the input image is a green/black grill pattern image 1640, the luminance levels of a second pixel (pixel 2) and a fourth pixel (pixel 4) are set to the first level. Thereby, sharpness of a second pixel area 1642 and the like is improved.

As shown in FIG. 15A(d), when the input image is a black/blue grill pattern image 1650, the luminance levels of a first pixel (pixel 1) and a third pixel (pixel 3) are set to the first level. Thereby, sharpness of a first pixel area 1652 and the like is improved.

Referring to FIG. 15A, an image display apparatus 100 according to an embodiment of the present invention may include a panel 210 having repeatedly arranged subpixels of RGBW, and including a plurality of pixels including a first pixel (Pixel 1), a second pixel (Pixel 2, and a third pixel (Pixel 3), each having at least three subpixels, wherein the first pixel (Pixel 1) is disposed immediately adjacent to the left side of the second pixel (Pixel 2) and the third pixel (Pixel 3) is disposed immediately adjacent to the right side of the second pixel (Pixel 2), and a timing controller 232 for applying, to at least one of the subpixels of the first pixel (Pixel 1) or the third pixel (Pixel 3), a part or entirety of data corresponding to a subpixel of a color not included in the second pixel (Pixel 2) among respective data applied to each of the subpixels included in the second pixel (Pixels 2).?????
When the luminance level of the second pixel is lower than or equal to a first reference level and the difference in luminance between the first pixel and the second pixel or between the second pixel and the third pixel is greater than or equal to a second reference level, the timing controller 232 may control the part or entirety of the data corresponding to the subpixel of the color not included in the second pixel not to be applied to at least one of the subpixels of the first pixel or the third pixel.

That is, the subpixel rendering unit 620 in the timing control unit 232 may apply, to at least one of the subpixels of the first pixel (Pixel 1) or the third pixel (Pixel 3), part or entirety of the data corresponding to the subpixel of a color not included in the second pixel (Pixel 2) among the respective data applied to the subpixels included in the second pixel (Pixel 2) to perform subpixel rendering.

When the input image is a white/black grill image or a black/white grill image, namely when the luminance level of the second pixel is less than or equal to the first reference level and the difference in luminance between the first pixel and the second pixel or between the second pixel and the third pixel is greater than or equal to a second reference level, the grill processor 630 may control a part or entirety of the data corresponding to the subpixel of a color not included in the second pixel not to be applied to at least one of the subpixels of the first pixel or the third pixel. That is, the grill processor 630 may control subpixel rendering not to be performed on the first pixel or the third pixel. Thereby, sharpness of the edge area may be improved when the white/black grill image or the black/white grill image is displayed on the RGBW type panel. As a result, sharpness of the edge area for a high-frequency signal may be improved on the RGBW type panel.

When the luminance level of the second pixel is lower than or equal to a first reference level and the difference in luminance between the first pixel and the second pixel or between the second pixel and the third pixel is greater than or equal to a second reference level, namely, when the input image is a white/black grill image or a black/white grill image, the grill processor 630 in the timing control unit 232 may apply a part or entirety of the data corresponding to the subpixel of a color not included in the second pixel to at least one of the subpixels of a pixel located above or below the second pixel.

That is, to perform subpixel rendering compensation, subpixel rendering is controlled not to be performed on the first and third pixels located on the horizontal line, but may be performed on subpixels located above or below the second pixel. Thereby, sharpness of the edge area may be improved when the white/black grill image or the black/white grill image is displayed on the RGBW type panel.

The timing controller 232 in the image display apparatus 100 of FIG. 15A may operate as disclosed in the description of FIG. 7A.

Specifically, when the luminance level of the second pixel is lower than or equal to a first reference level and the difference in luminance between the first pixel and the second pixel or between the second pixel and the third pixel is greater than or equal to a second reference level, the timing controller 232 sets the luminance level of the WRG data of the second pixel to the first level regardless of the RGB data of the first pixel or the BWR data of the third pixel. Thereby, sharpness of the edge area for a high-frequency signal may be improved on the RGBW type panel 210.

In the case of a white/black grill image, in which the first pixel and the third pixel are assigned white, and the second pixel and the fourth pixel are assigned black, the timing controller 232 may set the luminance levels of the WRG data of the second pixel and the GBW data of the fourth pixel to the first level regardless of the RGB data of the first pixel or the BWR data of the third pixel. Thereby, sharpness of the edge area for a high-frequency signal may be improved the RGBW type panel 210.

In the case of a white/black grill image, in which white is assigned to the first pixel and the third pixel, and black is assigned to the second pixel and the fourth pixel, the timing controller 232 may set the luminance levels of the RGB data of the first pixel and the BWR data of the third pixel to the second level higher than the first level regardless of the WRG data of the second pixel or the GBW data of the fourth pixel. Thereby, sharpness of the edge area for a high-frequency signal may be further improved.

Particularly, although subpixel rendering is performed, sharpness of the edge area of the grill pattern image may be improved.

According to another embodiment of the present invention, the image display apparatus 100 may include a panel 210 having RGBW subpixels that are repeatedly arranged and including a plurality of pixels including a first pixel (Pixel 1), a second pixel (Pixel 2, and a third pixel (Pixel 3), each having at least three subpixels and the first pixel (Pixel 1) and the pixel (Pixel 3) being disposed immediately adjacent to the left side and right side of the second pixel (Pixel 2), and a timing controller 232 for applying, to at least one of the subpixels of the first pixel (Pixel 1) or the third pixel (Pixel 3), a part or entirety of data corresponding to a subpixel of a color not included in the second pixel (Pixel 2) among the data applied to each of the subpixels included in the second pixel (Pixels 2). When the luminance level of the second pixel is lower than or equal to a first reference level, the difference in luminance between the first pixel and the second pixel or between the second pixel and the third pixel is greater than or equal to a second reference level, and data of a first color is allocated to the first pixel and the third pixel, the timing controller 232 may apply a part or entirety of the data corresponding to the subpixel of the first color included in the second pixel to one of the subpixels of the first pixel or the third pixel. Thereby, sharpness of the edge area may be improved when a color/black grill image or a black/color grill image is displayed on the RGBW type panel.

That is, the subpixel rendering unit 620 in the timing control unit 232 may apply, to at least one of the subpixels of the first pixel (Pixel 1) or the third pixel (Pixel 3), part or entirety of the data corresponding to the subpixel of a color not included in the second pixel (Pixel 2) among the respective data applied to the subpixels included in the second pixel (Pixel 2) to perform subpixel rendering.

When the input image is a color/black grill image or a black/color grill image, namely, when the luminance level of the second pixel is lower than or equal to a first reference level, the difference in luminance between the first pixel and the second pixel or between the second pixel and the third pixel is greater than or equal to a second reference level, and data of a first color is allocated to the first pixel and the third pixel, the grill processor 630 may apply a part or entirety of the data corresponding to the subpixel of the first color included in the second pixel to one of the subpixels of the first pixel or the third pixel. That is, subpixel rendering may be controlled to be performed on the first pixel or the third pixel such that the first color is not displayed on the second pixel. Thereby, sharpness of the edge area may be improved when a color/black grill image or a black/color grill image is displayed on the RGBW type panel. As a result, sharpness of the edge area for a high-frequency signal may be improved on the RGBW type panel.

Figure 15B:
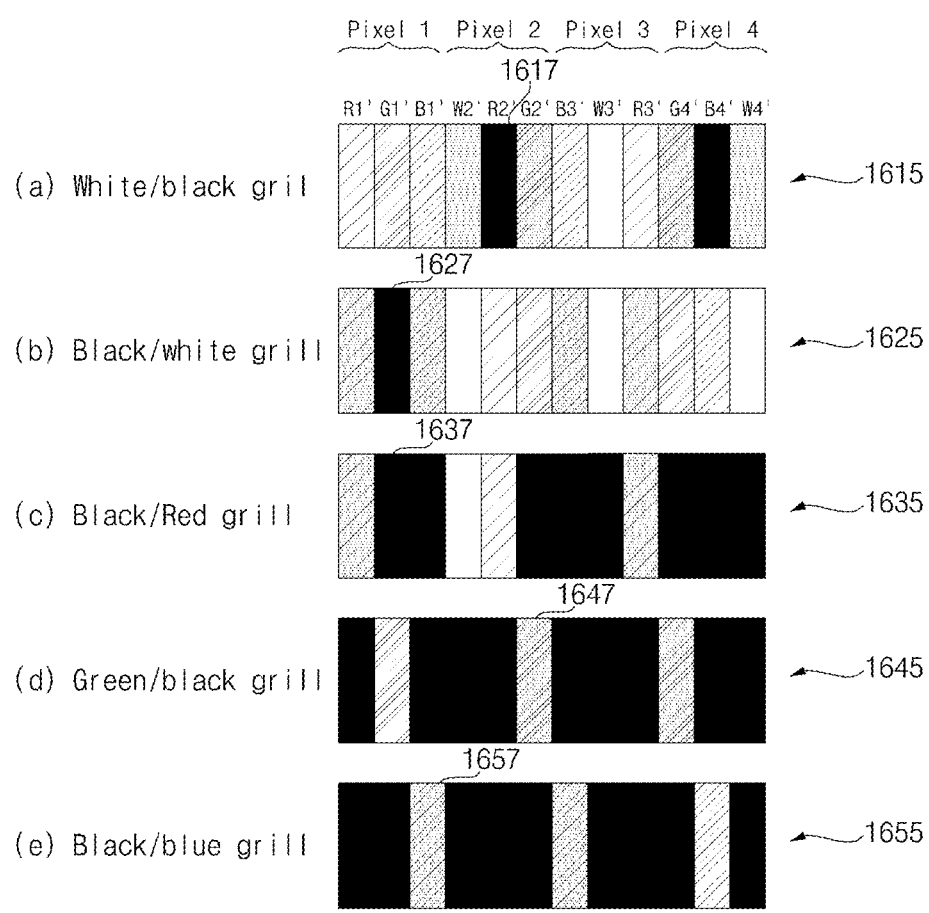

Next, FIG. 15B illustrates a case where subpixel rendering compensation such as level fixing is performed by the grill processor 630 when the grill processor 630 is located outside the timing control unit 232 as shown in FIG. 7C.

As shown in FIG. 15B, in the case of a white/black grill pattern image 1615, sharpness of the black area which is the pixel data 1617 of the second pixel is improved.

In the case of a black/white grill pattern image 1625, sharpness of the black area which is the pixel data 1627 of the first pixel is improved.

In the case of the black/red grill pattern image 1635, sharpness of the black area which is the pixel data 1617 of the first pixel is improved.

In the case of a green/black grill pattern image 1645, sharpness of the black area which is the pixel data 1647 of the second pixel is improved.

In the case of the black/blue grill pattern image 1655, sharpness of the black area which is the pixel data 1657 of the first pixel is improved.

Next, FIGS. 16A to 20B are diagrams illustrating sharpness improvement of each pattern image compensated by the grill processor of the present invention.

Figure 16A:
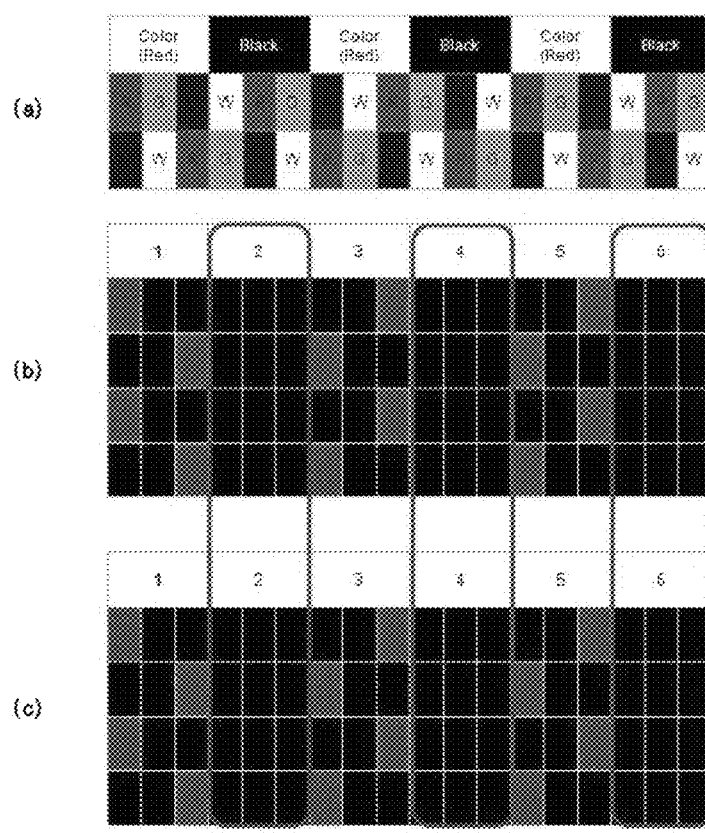
Figure 16B:
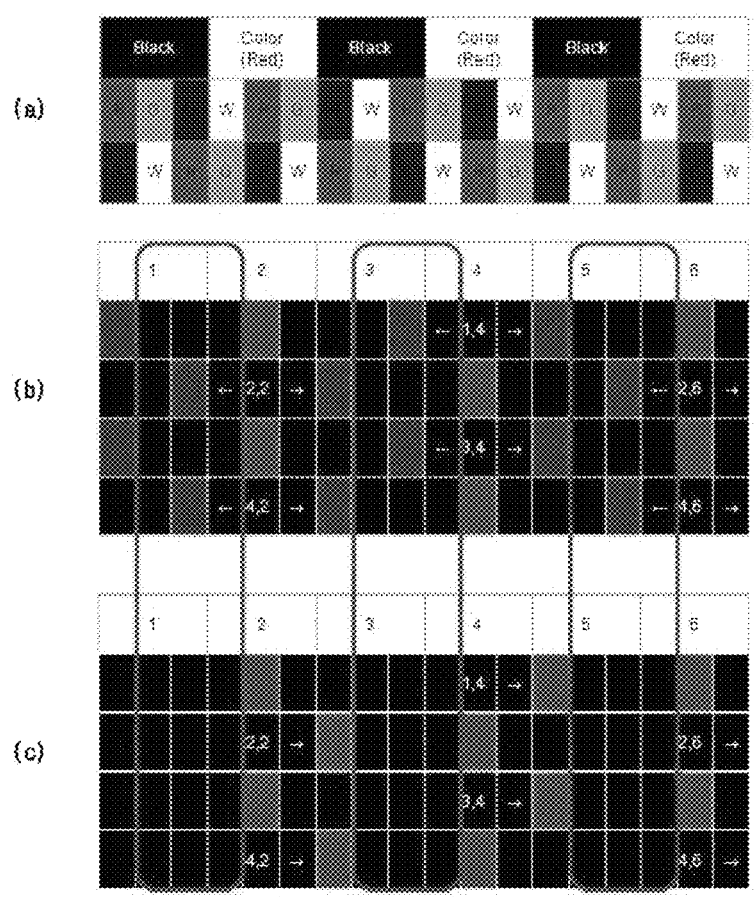

FIG. 16A illustrates that sharpness of the pixel data of the second pixel in a red/black grill pattern image remains unchanged in signal processing in the grill processor 630. FIG. 16B illustrates that sharpness of the pixel data in a black/red grill pattern image is improved by signal processing in the grill processor 630.

When the input image is a color/black grill image or a black/color grill image, namely, when the luminance level of the second pixel is lower than or equal to a first reference level, the difference in luminance between the first pixel and the second pixel or between the second pixel and the third pixel is greater than or equal to a second reference level, and data of a first color is allocated to the first pixel and the third pixel, the grill processor 630 may apply a part or entirety of the data corresponding to the subpixel of the first color included in the second pixel to one of the subpixels of the first pixel or the third pixel. That is, subpixel rendering may be controlled to be performed on the first pixel or the third pixel such that the first color is not displayed on the second pixel. Thereby, sharpness of the edge area may be improved when the first color is displayed in a color/black grill image or a black/color grill image on the RGBW type panel.

FIG. 16B illustrates that the luminance data of R of a pixel corresponding to the red area is transferred to the luminance data of R of an adjacent pixel or the like, enhancing red luminance presentation and sharpness of the edge area.

Figure 16C:
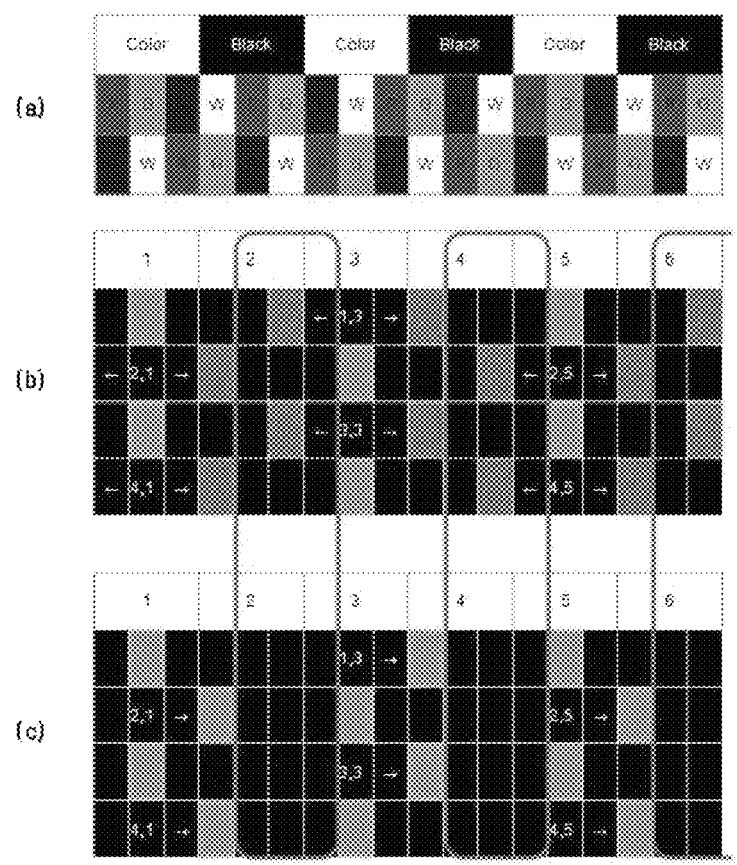
Figure 16D:
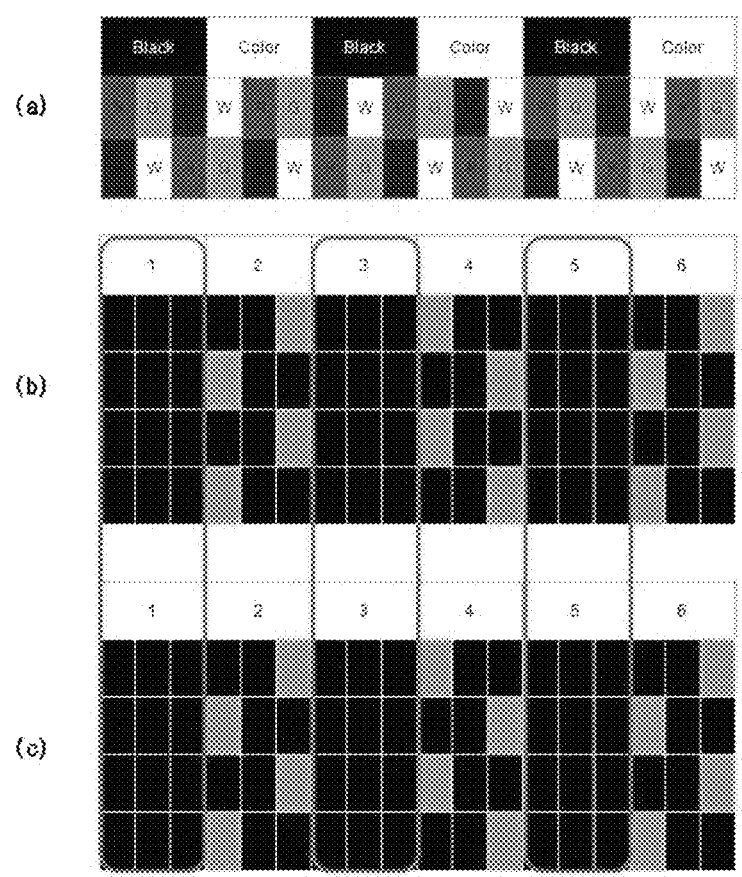

FIG. 16C illustrates that sharpness of the pixel data of the second pixel in a green/black grill pattern image is improved by signal processing in the grill processor 630, and FIG. 16D illustrates that sharpness of the pixel data of the first pixel in a black/green grill pattern image remains unchanged in signal processing in the grill processor 630.

FIG. 16C illustrates that the luminance data of G of a pixel corresponding to the green area is transferred to the luminance data of G of an adjacent pixel or the like, enhancing green luminance presentation and sharpness of the edge area.

Figure 17A:
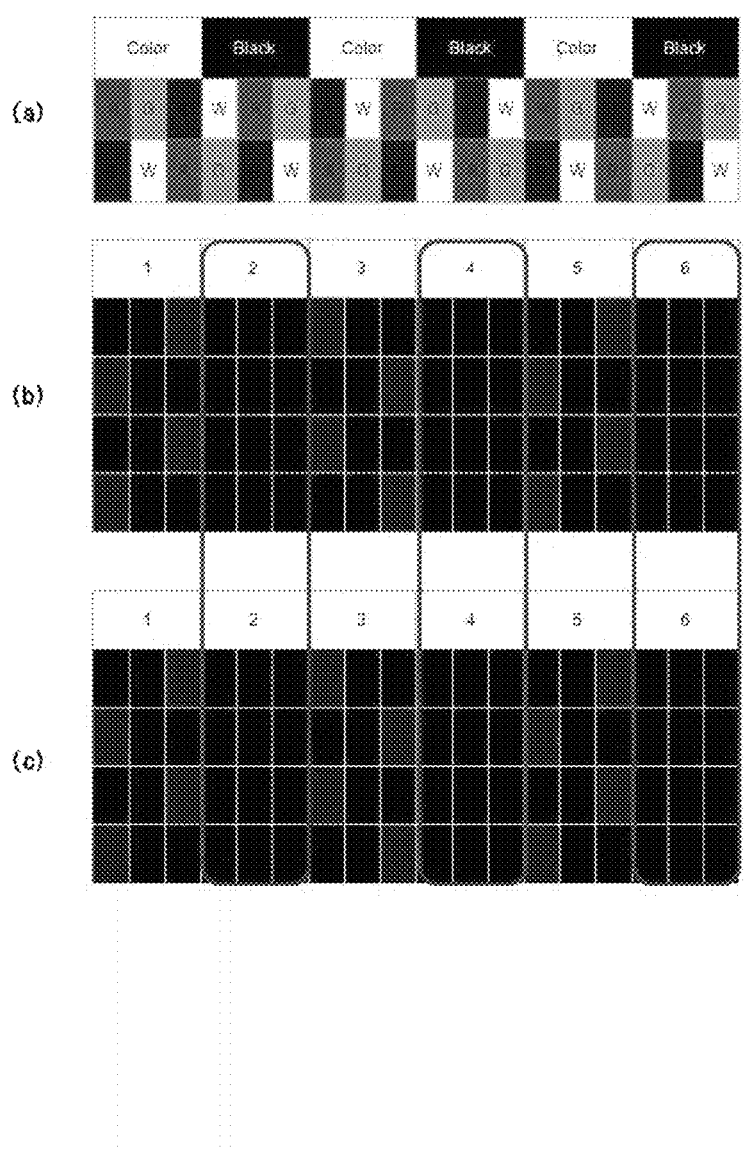
Figure 17B:
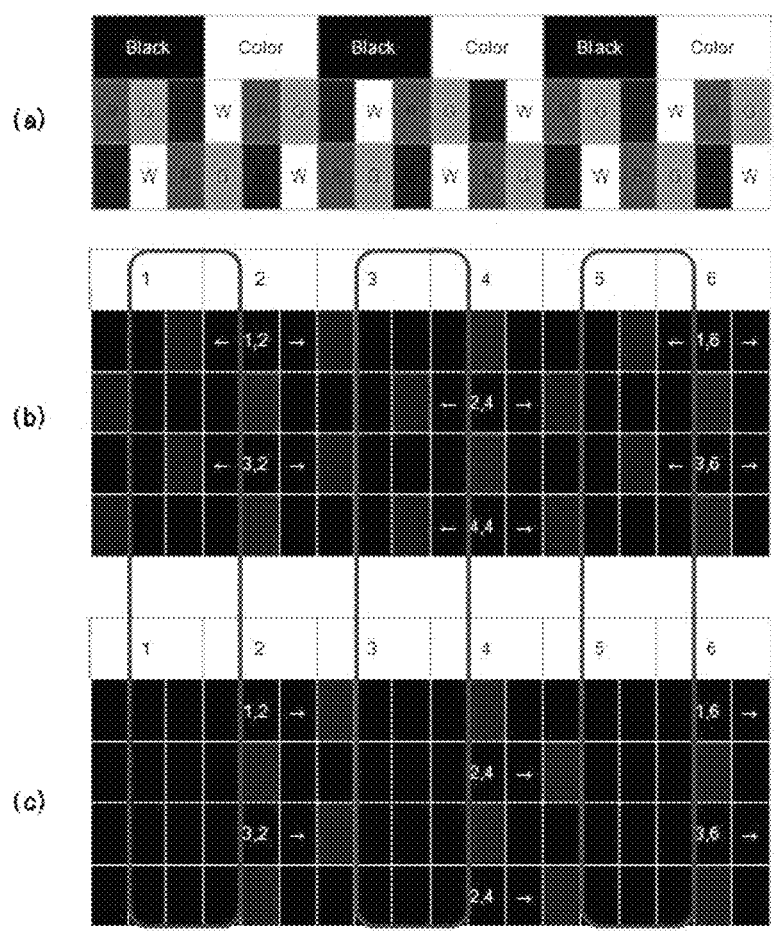

FIG. 17A illustrates that sharpness of the pixel data of the second pixel in a blue/black grill pattern image remains unchanged in signal processing in the grill processor 630. FIG. 17B illustrates that sharpness of the pixel data in a black/blue grill pattern image is improved by signal processing in the grill processor 630.

FIG. 17B illustrates that the luminance data of B of a pixel corresponding to the blue area is transferred to the luminance data of B of an adjacent pixel or the like, enhancing blue luminance presentation and sharpness of the edge area.

Figure 18A:
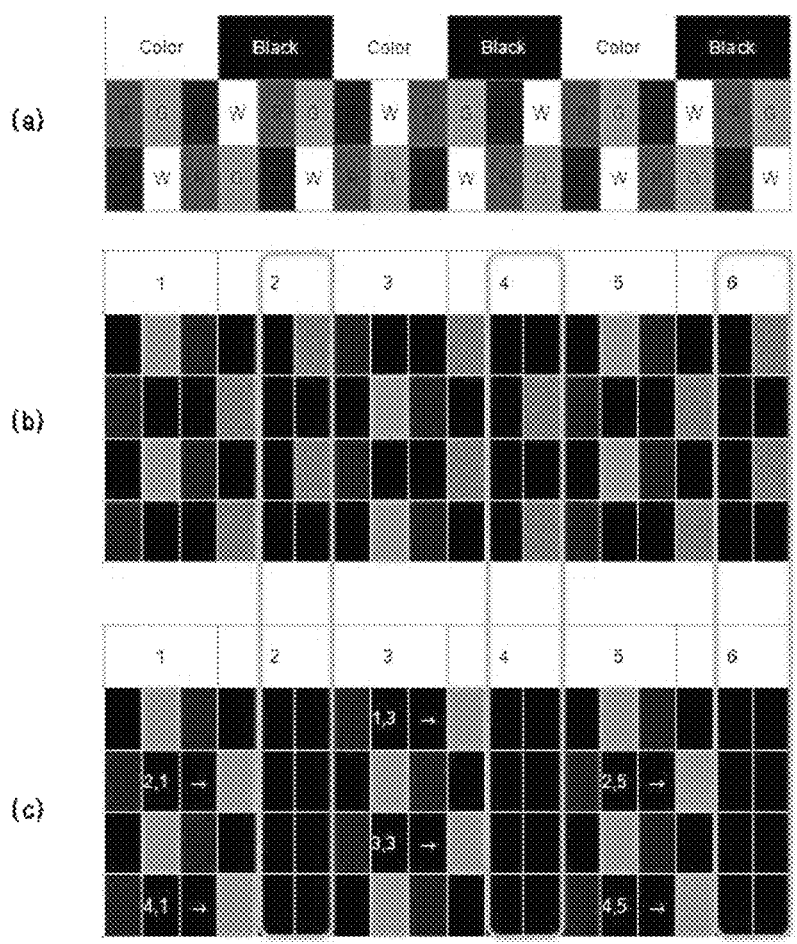
Figure 18B:
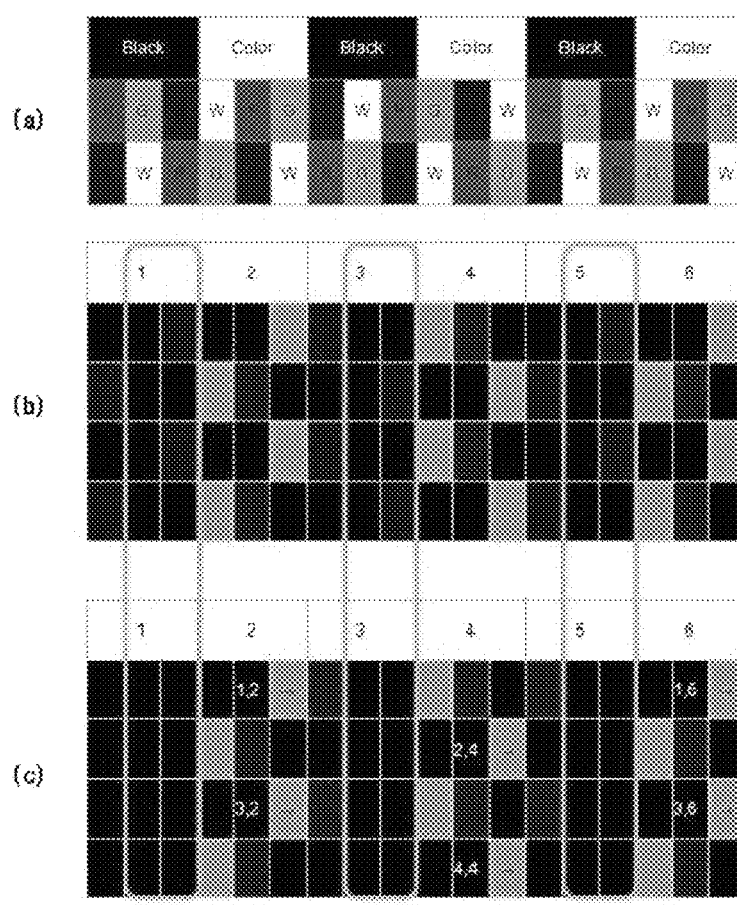

FIG. 18A illustrates that sharpness of the pixel data of the second pixel in a cyan/black grill pattern image is improved by signal processing in the grill processor 630, and FIG. 18B illustrates that sharpness of the pixel data of the first pixel in a black/cyan grill pattern image is improved by signal processing in the grill processor 630.

FIG. 18A illustrates that the luminance data of G of a pixel corresponding to the green area is transferred to the luminance data of G of an adjacent pixel or the like, enhancing green luminance presentation and sharpness of the edge area.

FIG. 18B illustrates that the luminance data of B of a pixel corresponding to the blue area is transferred to the luminance data of B of an adjacent pixel or the like, enhancing blue luminance presentation and sharpness of the edge area.

Figure 19A:
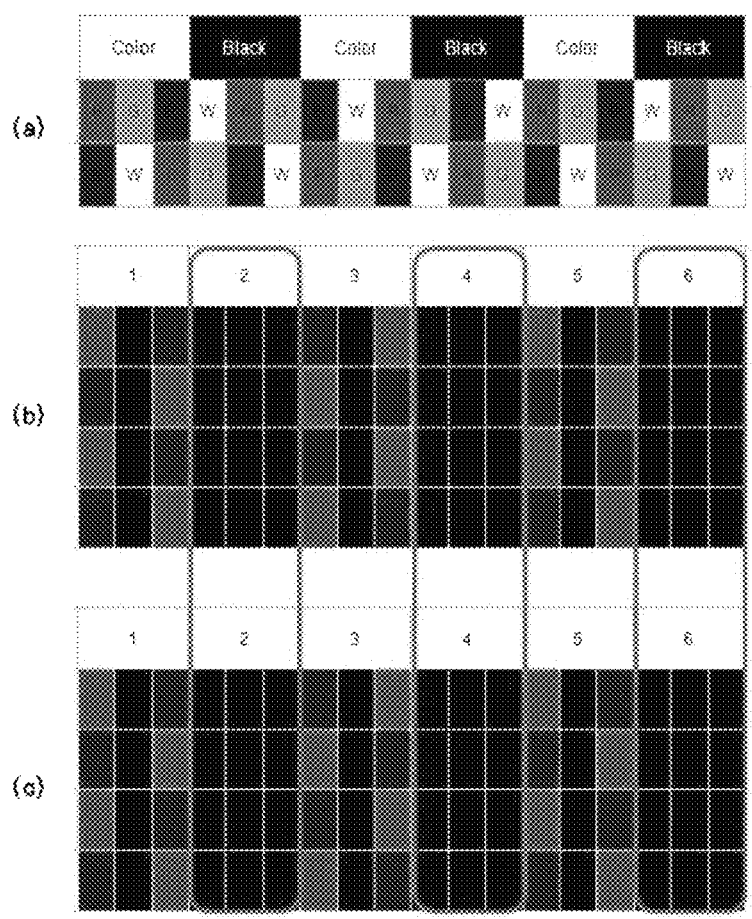
Figure 19B:
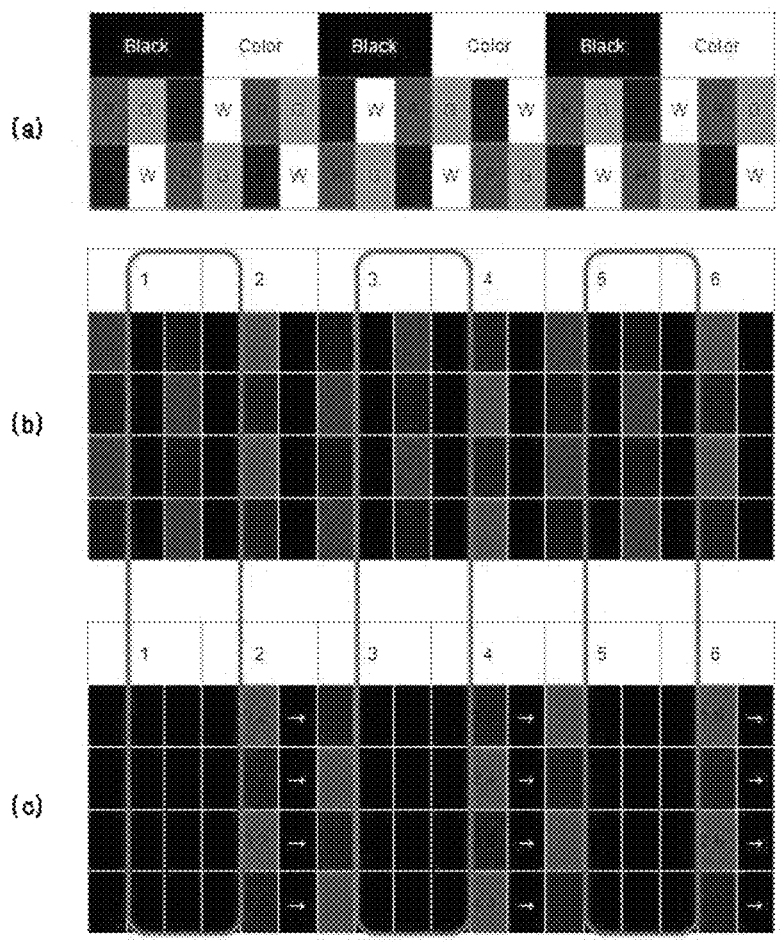

FIG. 19A illustrates that sharpness of the pixel data of the second pixel in a magenta/black grill pattern image is improved by performing subpixel rendering, and FIG. 19B illustrates that sharpness of the pixel data of the first pixel in a black/magenta grill pattern image is improved by signal processing in the grill processor 630.

Figure 20A:
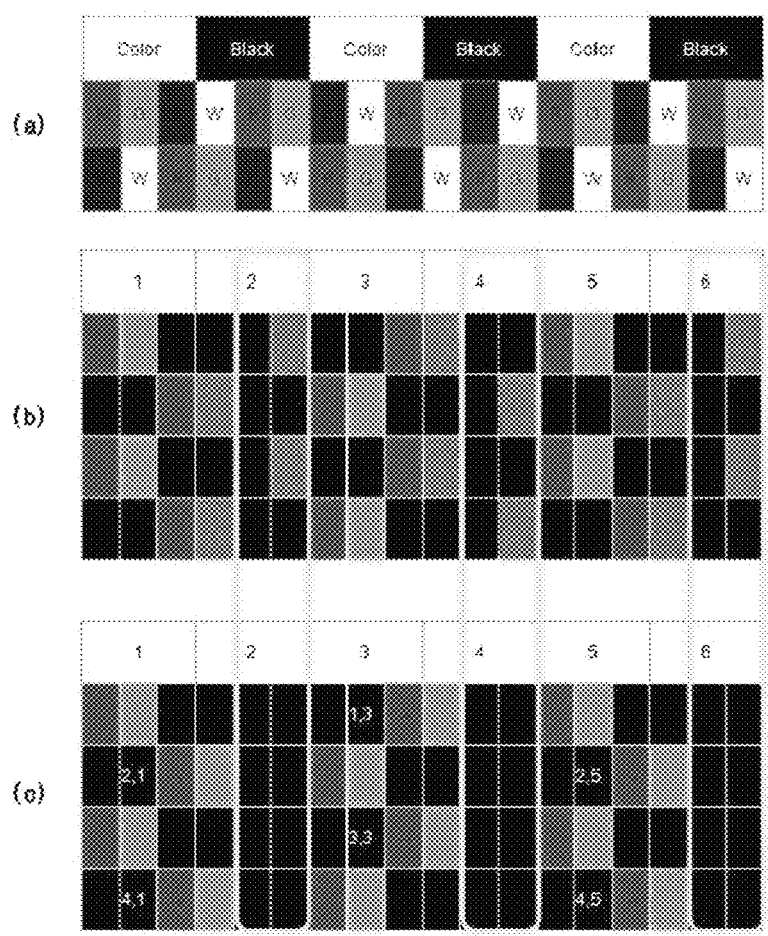
Figure 20B:
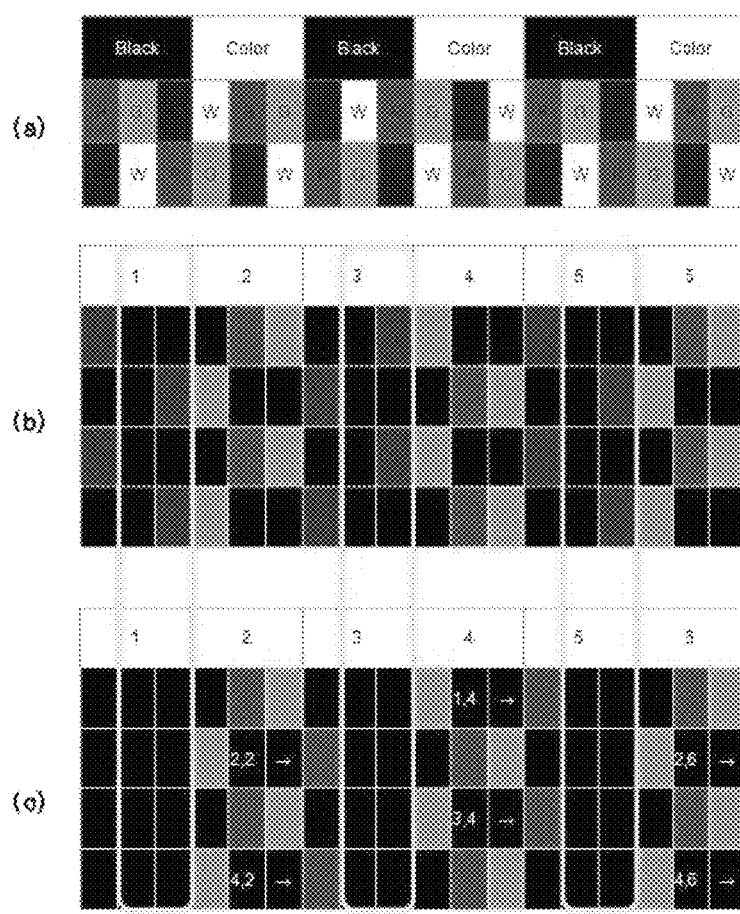

FIG. 20A illustrates that sharpness of the pixel data of the second pixel in a yellow/black grill pattern image is improved by performing subpixel rendering, and FIG. 20B illustrates that sharpness of the pixel data of the first pixel in a black/yellow grill pattern image is improved by signal processing in the grill processor 630.

An operation method for the image display apparatus according to the present invention is implementable by code which can be read by the processor on a recording medium which can be read by a processor provided to autonomous driving apparatus or vehicle. The recording medium readable by the processor includes all kinds of recording devices for storing data which can be read by the processor. Examples of the recording medium readable by the processor include ROM, RAM, CD-ROM, magnetic tape, floppy disk, and optical data storage. The method is also implementable in the form of a carrier wave such as transmission over the Internet. In addition, the recording medium readable by the processor may be distributed to computer systems connected over a network, and code which can be read by the processor in a distributed manner may be stored in the recording medium and executed.

As is apparent from the above description, according to an embodiment of the present invention, an image display apparatus includes a panel having repeatedly arranged subpixels of RGBW and including a plurality of pixels including a first pixel, a second pixel and a third pixel, each having at least three subpixels, wherein the first pixel is disposed immediately adjacent to a left side of the second pixel and the third pixel is disposed immediately adjacent to a right side of the second pixel, a controller for applying, to at least one of the subpixels of the first pixel or the third pixel, a part or entirety of data corresponding to a subpixel of a color not included in the second pixel among respective data applied to the subpixels included in the second pixel, wherein, when a luminance level of the second pixel is lower than or equal to a first reference level and a difference in luminance between the first pixel and the second pixel or between the second pixel and the third pixel is greater than or equal to a second reference level, the controller may not apply the part or entirety of the data corresponding to the subpixel of the color not included in the second pixel to at least one of the subpixels of the first pixel or the third pixel. As a result, sharpness of the edge area for a high-frequency signal may be improved on the RGBW type panel.

In particular, when the luminance level of the second pixel is lower than or equal to the first reference level and the difference in luminance between the first pixel and the second pixel or between the second pixel and the third pixel is greater than or equal to the second reference level, the luminance level of the WRG data of the second pixel is set to the first level regardless of the RGB data of the first pixel or the BWR data of the third pixel. Thereby, sharpness of the edge area for a high-frequency signal may be improved on the RGBW type panel.

That is, although the subpixel rendering is performed, sharpness of the edge area can be improved for the video signal of the grill pattern image may be improved.

In the case of a white/black grill image, the luminance levels of the WRG data of the second pixel and the GBW data of the fourth pixel are set to the first level regardless of the RGB data of the first pixel or the BWR data of the third pixel. Thereby, sharpness of the edge area for a high-frequency signal may be improved on the RGBW type panel.

In the case of a white/black image, the luminance levels of the RGB data of the first pixel and the BWR data of the third pixel are set to be a second level larger than the first level, regardless of the WRG data of the second pixel or the GBW data of the fourth pixel. Thereby, sharpness of the edge area may be further improved.

In the case of a black/white grill image, the RGB data of the first pixel and the BWR data of the third pixel are set to the first level regardless of the luminance level of the WRG data of the second pixel or the GBW data of the fourth pixel. Thereby, sharpness of the edge area for a high-frequency signal may be improved on the RGBW type panel.

In the case of a black/white grill image, the WRG data of the second pixel and the GBW data of the fourth pixel are set to the second level higher than the first level, regardless of the RGB data of the first pixel or the BWR data of the BWR data of the third pixel. Thereby, sharpness of the edge area can be further improved.

In the case of a color/black grill image, the luminance levels of the WRG data of the second pixel and the GBW data of the fourth pixel are set to the first level regardless of the RGB data of the first pixel or the BWR data of the third pixel. Thereby, sharpness of the edge area for a high-frequency signal may be improved on the RGBW type panel.

In the case of a color/black grill image, the luminance levels of the RGB data of the first pixel and the BWR data of the third pixel are set to a third level higher than the first level regardless of the WRG data of the second pixel or the GBW data of the fourth pixel. Thereby, sharpness of the edge area can be further improved.

In the case of a black/color grill image, the RGB data of the first pixel and the BWR data of the third pixel are set to the first level regardless of the luminance level of the WRG data of the second pixel or the GBW data of the fourth pixel. Thereby, sharpness of the edge area for a high-frequency signal may be improved on the RGBW type panel.

In the case of a black/color grill image, the WRG data of the second pixel and the GBW data of the fourth pixel are set to the third lever higher than the first level, regardless of the luminance level of the RGB level of the first pixel or the BWR data of the third pixel. Thereby, sharpness of the edge area can be further improved.

According to another embodiment of the present invention, there is provided an image display apparatus including a panel having repeatedly arranged subpixels of RGBW and including a plurality of pixels including a first pixel, a second pixel and a third pixel, each having at least three subpixels, wherein the first pixel is disposed immediately adjacent to a left side of the second pixel and the third pixel is disposed immediately adjacent to a right side of the second pixel, a controller for applying, to at least one of the subpixels of the first pixel or the third pixel, a part or entirety of data corresponding to a subpixel of a color not included in the second pixel among respective data applied to the subpixels included in the second pixel, wherein, when the luminance level of the second pixel is lower than or equal to a first reference level, the difference in luminance between the first pixel and the second pixel or between the second pixel and the third pixel is greater than or equal to a second reference level, and data of a first color is allocated to the first pixel and the third pixel, the controller may apply a part or entirety of data corresponding to a subpixel of the first color included in the second pixel to at least one of the subpixels of the first pixel or the third pixel. As a result, sharpness of the edge area for a high-frequency signal may be improved on the RGBW type panel.

According to another embodiment of the present invention, there is provided an image display apparatus including a panel having repeatedly arranged subpixels of RGBW, a timing controller for converting an input RGB video signal into an RGBW video signal and generating, based on RGB data of a first pixel or BWR data of a third pixel, WRG data corresponding to a second pixel, and a grill processor for setting a luminance level of the WRG data of the second pixel to a first level regardless of the RGB data of the first pixel or the BWR data of the third pixel when a luminance level of the second pixel is lower than or equal to a first reference level and a difference in luminance between the first pixel and the second pixel or between the second pixel and the third pixel is greater than or equal to a second reference level. Thereby, sharpness of the edge area for a high-frequency signal may be improved on the RGBW type panel.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An image display apparatus comprising: a panel including a first pixel, a second pixel, a third pixel, and a fourth pixel, wherein each of the first pixel to the fourth pixel has a different combination of three sub-pixels among four possible subpixels of different colors, wherein the first to the fourth pixel are arranged side by side in a horizontal direction, and wherein the first pixel is disposed adjacent to a left side of the second pixel, the third pixel is disposed adjacent to a right side of the second pixel, and the fourth pixel is disposed adjacent to a right side of the third pixel; a controller which generates subpixel data corresponding to the subpixels of the second pixel using input subpixel data corresponding to the subpixels of the first pixel and input subpixel data corresponding to the subpixels of the third pixel, wherein, when a luminance level of the second pixel is lower than or equal to a first reference level and a difference in luminance between the first pixel and the second pixel or between the second pixel and the third pixel is greater than or equal to a second reference level, the controller generates subpixel data corresponding to the subpixels of the second pixel without using input subpixel data corresponding to the subpixels of the first pixel or input subpixel data corresponding to the subpixels of the third pixel.

2. The image display apparatus according to claim 1, wherein, when the luminance level of the second pixel is lower than or equal to the first reference level and the difference in luminance between the first pixel and the second pixel or between the second pixel and the third pixel is greater than or equal to the second reference level, the controller sets a luminance level of the WRG subpixels of the second pixel to a first level.

3. The image display apparatus according to claim 2, wherein, when the image display apparatus displays a white/black pattern image having the first pixel and the third pixel assigned white and the second pixel and the fourth pixel assigned black, the controller sets the luminance levels of the WRG subpixels of the second pixel and the GBW subpixels of the fourth pixel to the first level.

4. The image display apparatus according to claim 3, when the image display apparatus displays the white/black pattern image, the controller sets the luminance levels of the RGB subpixels of the first pixel and the BWR subpixels of the third pixel to a second level higher than the first level.

5. The image display apparatus according to claim 2, wherein, when the image display apparatus displays a white/black pattern image having the first pixel and third pixel assigned black and the second pixel and the fourth pixel assigned white, the controller sets the luminance levels of the RGB subpixels of the first pixel and the BWR subpixels of the third pixel to the first level.

6. The image display apparatus according to claim 5, wherein, when the image display apparatus displays a white/black pattern image having the first pixel and third pixel assigned black and the second pixel and the fourth pixel assigned white, the controller sets the luminance levels of the WRG subpixels of the second pixel and the GBW subpixels of the fourth pixel to a second level higher than the first level.

7. The image display apparatus according to claim 2, wherein, when the image display apparatus displays a color/black pattern image having the first pixel and the third pixel each assigned one of red, green, or blue and the second pixel and the fourth pixel assigned black, the controller:
sets the luminance levels of the WRG subpixels of the second pixel and the GBW subpixels of the fourth pixel to the first level, and
sets the luminance levels of the RGB subpixels of the first pixel and the BWR subpixels of the third pixel to a third level higher than the first level.

8. The image display apparatus according to claim 2, wherein, when the image display apparatus displays a color/black pattern image having the first pixel and the third pixel assigned black and the second pixel and the fourth pixel each assigned one of red, green, or blue, the controller:
sets the luminance levels of the RGB subpixels of the first pixel and the BWR subpixels of the third pixel to the first level, and
sets the luminance levels of the WRG subpixels of the second pixel and the GBW subpixels of the fourth pixel to a third level higher than the first level.

9. The image display apparatus according to claim 2, wherein the controller:
converts the RGB video signal into an RGBW video signal;
performs subpixel rendering on the RGBW video signal; and
sets the luminance level of one of the first pixel or the second pixel to the first level when the subpixel-rendered RGBW video signal includes a predetermined pattern image.

10. The image display apparatus according to claim 9, wherein, when the subpixel-rendered RGBW video signal includes the predetermined pattern image, the controller sets the luminance level of the other of the first pixel or the second pixel to a second level higher than the first level.

11. The image display apparatus according to claim 9, wherein, when the RGBW video signal does not include the predetermined pattern image or a dot pattern image, the panel displays an image corresponding to the subpixel-rendered RGBW video.

12. The image display apparatus according to claim 9, wherein the controller:
detects the predetermined pattern image from the RGB video signal; and
compensates for the predetermined pattern image by setting the luminance level of the first pixel or the second pixel to the first level when the predetermined grill pattern image is detected.

13. An image display apparatus comprising:
a panel including a first pixel having RGB subpixels, a second pixel having WRG subpixels, a third pixel having BWR subpixels, and a fourth pixel having GBW subpixels, wherein the first pixel to the fourth pixel are arranged side by side in a horizontal direction;
a controller for:
converting an input RGB video signal into an RGBW video signal;

generating, based on RGB data of the first pixel or BWR data of the third pixel, WRG data corresponding to the second pixel; and setting a luminance level of the WRG subpixels of the second pixel to a first level when a luminance level of the second pixel is lower than or equal to a first reference level and a difference in luminance between the first pixel and the second pixel or between the second pixel and the third pixel is greater than or equal to a second reference level.

14. The image display apparatus according to claim 13, wherein, when the image display apparatus displays a white/black pattern image having the first pixel and the third pixel assigned white and the second pixel and a fourth pixel assigned black, the controller:

sets the luminance levels of the WRG subpixels of the second pixel and the GBW subpixels of the fourth pixel to the first level, and sets the luminance levels of the RGB pixels of the first pixel and the BWR pixels of the third pixel to a second level higher than the first level.

15. The image display apparatus according to claim 13, wherein, when the image display apparatus displays a black/white pattern image having the first pixel and third pixel assigned black and the second pixel and the fourth pixel assigned white, the controller:

sets the luminance levels of the RGB subpixels of the first pixel and the BWR subpixels of the third pixel to the first level, and sets the luminance levels of the WRG subpixels of the second pixel and the GBW subpixels of the fourth pixel to the second level higher than the first level.

16. The image display apparatus according to claim 13, wherein, when the image display apparatus displays a color/black pattern image having the first pixel and the third pixel each assigned one of red, green, or blue and the second pixel and the fourth pixel assigned black, the controller:

sets the luminance levels of the WRG subpixels of the second pixel and the GBW subpixels of the fourth pixel to the first level.

17. The image display apparatus according to claim 13, wherein, when the image display apparatus displays a black/color pattern image having the first pixel and the third pixel assigned black and the second pixel and the fourth pixel each assigned one of red, green, or blue, the controller sets the luminance values of the RGB subpixels of the first pixel and the BWR subpixel data of the third pixel to the first level.

* * * * *